(12) United States Patent
Kim et al.

(10) Patent No.: US 9,232,517 B2
(45) Date of Patent: Jan. 5, 2016

(54) METHOD FOR SCHEDULING BUNDLING IN WIRELESS ACCESS SYSTEM AND APPARATUS FOR SAME

(71) Applicant: LG ELECTRONICS INC., Seoul (KR)

(72) Inventors: Jinmin Kim, Anyang-si (KR); Seunghee Han, Anyang-si (KR); Hyukmin Son, Anyang-si (KR); Hyunwoo Lee, Anyang-si (KR); Hyeyoung Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/345,627

(22) PCT Filed: Oct. 4, 2012

(86) PCT No.: PCT/KR2012/008036
§ 371 (c)(1),
(2) Date: Mar. 18, 2014

(87) PCT Pub. No.: WO2013/051856
PCT Pub. Date: Apr. 11, 2013

(65) Prior Publication Data
US 2015/0003425 A1 Jan. 1, 2015

Related U.S. Application Data

(60) Provisional application No. 61/542,829, filed on Oct. 4, 2011, provisional application No. 61/546,565, filed on Oct. 13, 2011.

(51) Int. Cl.
*H04J 3/00* (2006.01)
*H04W 72/04* (2009.01)
(Continued)

(52) U.S. Cl.
CPC ........... *H04W 72/042* (2013.01); *H04L 5/0055* (2013.01); *H04L 5/0092* (2013.01); *H04L 5/1469* (2013.01); *H04W 72/1289* (2013.01); *H04L 5/001* (2013.01)

(58) Field of Classification Search
CPC ..... H04L 5/001; H04L 5/0053; H04L 5/0091; H04L 5/1469; H04W 72/042
USPC ...................... 370/252, 336; 455/70
See application file for complete search history.

(56) References Cited

U.S. PATENT DOCUMENTS

2010/0279628 A1* 11/2010 Love et al. ............. 455/70
2011/0149774 A1* 6/2011 Chen et al. ............. 370/252
(Continued)

FOREIGN PATENT DOCUMENTS

KR 1020100080483 7/2010
KR 1020100099664 9/2010
(Continued)

OTHER PUBLICATIONS

PCT International Application No. PCT/KR2012/008036, Written Opinion of the International Searching Authority dated Jan. 24, 2013, 17 pages.
(Continued)

*Primary Examiner* — Wanda Z Russell
(74) *Attorney, Agent, or Firm* — Lee, Hong, Degerman, Kang & Waimey

(57) ABSTRACT

Disclosed are a method for scheduling bundling in a wireless access system and an apparatus for same. In particular, the method includes the steps of: transmitting bundled downlink control information (DCI), including a plurality of pieces of downlink control information, to a terminal through a single physical downlink control channel (PDCCH); and transmitting downlink data to the terminal through a plurality of physical downlink shared channels (PDSCH) scheduled by the bundled DCI.

20 Claims, 16 Drawing Sheets

(51) Int. Cl.
*H04L 5/14* (2006.01)
*H04W 72/12* (2009.01)
*H04L 5/00* (2006.01)

(56) References Cited

U.S. PATENT DOCUMENTS

| | | | |
|---|---|---|---|
| 2011/0243066 A1* | 10/2011 | Nayeb Nazar et al. | 370/328 |
| 2012/0033624 A1* | 2/2012 | Luo et al. | 370/329 |
| 2012/0257552 A1* | 10/2012 | Chen et al. | 370/280 |
| 2013/0188589 A1* | 7/2013 | Nakashima et al. | 370/329 |

FOREIGN PATENT DOCUMENTS

| | | |
|---|---|---|
| WO | 2010079728 | 7/2010 |
| WO | 2011037439 | 3/2011 |

OTHER PUBLICATIONS

PCT International Application No. PCT/KR2012/008036, Written Opinion of the International Searching Authority dated Jan. 24, 2013, 12 pages.

New Postcom, "Downlink Control Signaling Enhancements," 3GPP TSG RAN WG1 Meeting #66bis, R1-112986, Oct. 2011, 4 pages.

NTT DOCOMO, "DL Control Channel Enhancement for DL MIMO in Rel-11," 3GPP TSG RAN WG1 Meeting #65, R1-111636, May 2011, 6 pages.

Pantech, "On PDCCH bundling," 3GPP TSG-RAN WG1 #66, R1-112285, Aug. 2011, 2 pages.

European Patent Office Application Serial No. 12838907.9, Search Report dated Feb. 9, 2015, 7 pages.

* cited by examiner

FIG. 12
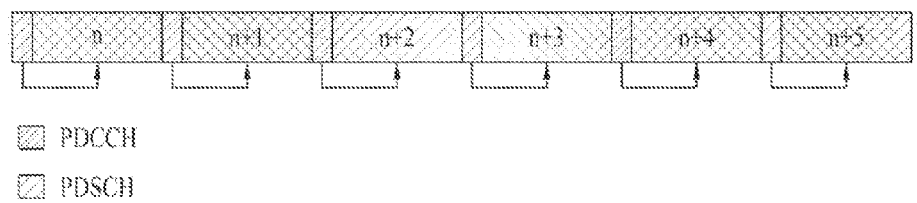
☐ PDCCH
☐ PDSCH
FIG. 13
(a) Bundling size = 3
(b) Bundling size = 4
☐ Bundled PDCCH
☐ PDSCH

METHOD FOR SCHEDULING BUNDLING IN WIRELESS ACCESS SYSTEM AND APPARATUS FOR SAME

CROSS-REFERENCE TO RELATED APPLICATIONS

This application is the National Stage filing under 35 U.S.C. 371 of International Application No. PCT/KR2012/008036, filed on Oct. 4, 2012, which claims the benefit of U.S. Provisional Application Ser. Nos. 61/542,829, filed on Oct. 4, 2011, and 61/546,565, filed on Oct. 13, 2011, the contents of which are all hereby incorporated by reference herein in their entirety.

TECHNICAL FIELD

The present invention relates to a wireless access system and, more particularly, to a time domain bundling scheduling method in a wireless access system, and an apparatus therefor.

BACKGROUND ART

One of major requirements for a next-generation wireless access system is high data rate. To this end, research is being conducted on various technologies such as Multiple Input Multiple Output (MIMO), Cooperative Multiple Point Transmission (CoMP), relay, etc.

A legacy wireless access system mainly considers only one carrier even when downlink and uplink bandwidths are configured differently. For example, a wireless communication system having one carrier configured for each of downlink and uplink and forming symmetry between downlink and uplink bandwidths was provided based on a single carrier.

However, considering that frequency resources are currently full, in order to ensure a wide bandwidth capable of satisfying higher data rate, each of scattered bandwidths is designed to satisfy basic requirements for operating an independent system and carrier aggregation (CA)/multiple cells technology is adopted to aggregate a plurality of bandwidths with a single system.

Here, a bandwidth-based carrier capable of independently operating may be referred to as a component carrier (CC). In order to support increased transmission capacity, the latest 3rd Generation Partnership Project (3GPP) Long Term Evolution-Advanced (LTE-A) or 802.16m system continuously extends its bandwidth up to 20 MHz or above. In this case, one or more CCs are aggregated to support wideband. For example, if one CC supports a bandwidth of 5 MHz, 10 MHz or 20 MHz, up to 5 CCs are aggregated to support a system bandwidth of up to 100 MHz.

However, to achieve maximum performance of the above technology, downlink control channels for a legacy system may not be used.

DISCLOSURE

Technical Object

An object of the present invention is to provide a method for efficiently scheduling downlink/uplink data between a user equipment (UE) and a base station (BS) in a wireless access system, and an apparatus therefor.

Another object of the present invention is to provide a method for co-scheduling a plurality of data channels using one control channel, and an apparatus therefor.

It is to be understood that both the foregoing general description and the following detailed description of the present invention are exemplary and explanatory and are intended to provide further explanation of the invention as claimed.

Technical Solution

In an aspect of the present invention, disclosed herein a method for time domain bundling scheduling in a wireless access system, the method including transmitting bundled downlink control information (DCI) comprising a plurality of DCI to a user equipment (UE) via one physical downlink control channel (PDCCH), and transmitting downlink data to the UE via a plurality of physical downlink shared channels (PDSCHs) scheduled by the bundled DCI.

In another aspect of the present invention, disclosed herein is a base station (BS) supporting time domain bundling scheduling in a wireless access system, the BS including a radio frequency (RF) unit configured to transmit and receive radio signals, and a processor configured to transmit bundled downlink control information (DCI) comprising a plurality of DCI to a user equipment (UE) via one physical downlink control channel (PDCCH), and transmit downlink data to the UE via a plurality of physical downlink shared channels (PDSCHs) scheduled by the bundled DCI.

Preferably, information about whether scheduling by the bundled DCI may be transmitted to the UE.

Preferably, the plurality of DCI may be sequentially arranged within the bundled DCI.

Preferably, at least one field may be omitted in remaining DCI other than DCI scheduling a most preceding PDSCH in a time domain from among the plurality of DCI, and information of the omitted field may be replaced with information included in a corresponding field of the DCI scheduling the most preceding PDSCH in the time domain.

Preferably, the omitted field may include at least one of a resource assignment field, a modulation and coding scheme (MCS) field, a redundancy version field, a transmit power control command field, or a precoding information field.

Preferably, the number of the plurality of PDSCHs may be determined using a payload size of the bundled DCI.

Preferably, at least one field may be omitted in remaining DCI other than DCI scheduling a most preceding PDSCH in a time domain from among the plurality of DCI, and information of the omitted field may be indicated by information included in a corresponding field of the DCI scheduling the most preceding PDSCH in the time domain.

Preferably, the omitted field may include a hybrid automatic repeat and request (HARQ) process number field.

Preferably, a HARQ process number field may be omitted in the bundled DCI, and a retransmission timing of the plurality of PDSCHs may be determined based on an initial transmission timing of the plurality of PDSCHs or an acknowledgement/negative-acknowledgement (ACK/NACK) transmission timing of the UE.

Preferably, the bundled DCI may be transmitted in either a common search space (CSS) or a UE-specific search space (USS).

In an aspect of the present invention, disclosed herein is a method for time domain bundling scheduling in a wireless access system, the method including receiving bundled downlink control information (DCI) comprising a plurality of DCI from a base station (BS) via one physical downlink control channel (PDCCH), and receiving downlink data from the BS via a plurality of physical downlink shared channels (PDSCHs) scheduled by the bundled DCI.

In another aspect of the present invention, disclosed herein is a user equipment (UE) supporting time domain bundling scheduling in a wireless access system, the UE including a radio frequency (RF) unit configured to transmit and receive radio signals, and a processor configured to receive bundled downlink control information (DCI) comprising a plurality of DCI from a base station (BS) via one physical downlink control channel (PDCCH), and receiving downlink data from the BS via a plurality of physical downlink shared channels (PDSCHs) scheduled by the bundled DCI.

Preferably, information about whether scheduling by the bundled DCI is configured may be received from the BS.

Preferably, the plurality of DCI may be sequentially arranged within the bundled DCI.

Preferably, at least one field may be omitted in remaining DCI other than DCI scheduling a most preceding PDSCH in a time domain from among the plurality of DCI, and information of the omitted field may be replaced with information included in a corresponding field of the DCI scheduling the most preceding PDSCH in the time domain.

Preferably, the omitted field may include at least one of a resource assignment field, a modulation and coding scheme (MCS) field, a redundancy version field, a transmit power control (TPC) command field, or a precoding information field.

Preferably, the number of the plurality of PDSCHs may be determined using a payload size of the bundled DCI.

Preferably, at least one field may be omitted in remaining DCI other than DCI scheduling a most preceding PDSCH in a time domain from among the plurality of DCI, and information of the omitted field may be indicated by information included in a corresponding field of the DCI scheduling the most preceding PDSCH in the time domain.

Preferably, the omitted field may include a hybrid automatic repeat and request (HARQ) process number field.

Preferably, a HARQ process number field may be omitted in the bundled DCI, and a retransmission timing of the plurality of PDSCHs may be determined based on an initial transmission timing of the plurality of PDSCHs or an acknowledgement/negative-acknowledgement (ACK/NACK) transmission timing of the UE.

Preferably, the bundled DCI may be transmitted in either a common search space (CSS) or a UE-specific search space (USS).

It is to be understood that both the foregoing general description and the following detailed description of the present invention are exemplary and explanatory and are intended to provide further explanation of the invention as claimed.

Advantageous Effects

According to an embodiment of the present invention, downlink/uplink data may be efficiently scheduled between a user equipment (UE) and a base station (BS) in a wireless access system.

In addition, a plurality of data channels may be co-scheduled using bundled downlink control information in the time domain.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 12 exemplarily illustrates a DL resource assignment procedure using a legacy physical downlink control channel (PDCCH) in a frequency division duplex (FDD) system;

FIG. 13 exemplarily illustrates time domain PDCCH bundling scheduling according to an embodiment of the present invention;

MODE FOR INVENTION

Figure 1:
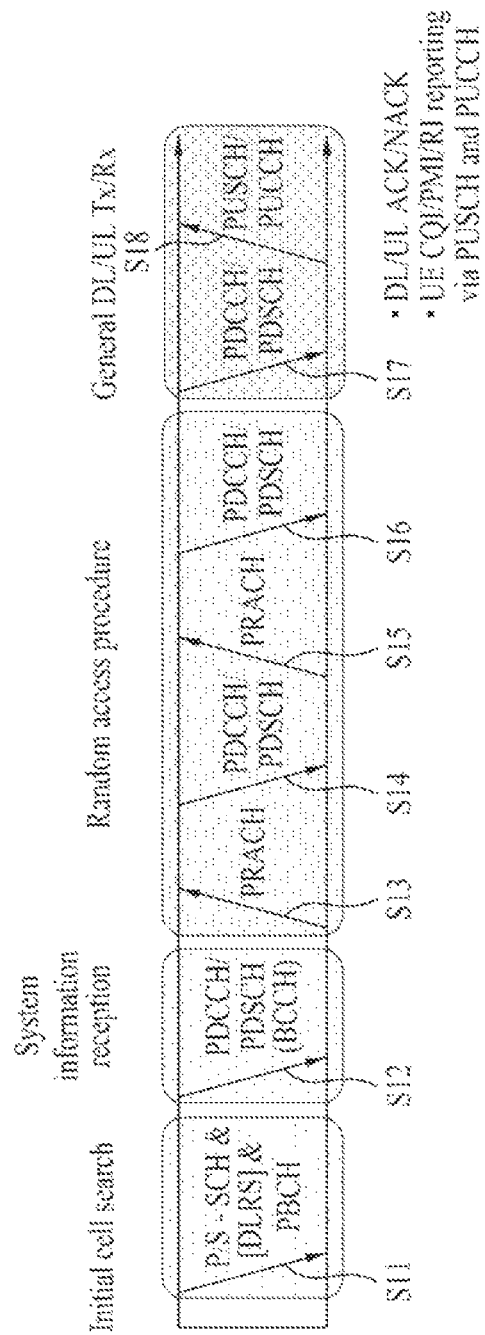
FIG. 1 illustrates physical channels used in the 3rd Generation Partnership Project (3GPP) Long Term Evolution (LTE) system and a general signal transmission method using the same.

Reference will now be made in detail to the preferred embodiments of the present invention, examples of which are illustrated in the accompanying drawings. The detailed description set forth herein in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a description is made centering on a data transmission and reception correlation between a base station (BS) and a terminal Here, the BS may be a terminal node of a network, which directly communicates with the terminal. In some cases, a specific operation described as performed by the BS may be performed by an upper node of the BS. Namely, it is apparent that, in a network composed of a plurality of network nodes including a BS, various operations performed for communication with a terminal may be performed by the BS, or network nodes other than the BS. The term 'BS' may be replaced with the term 'fixed station', 'Node B', 'enhanced Node B (eNodeB or eNB)', 'access point (AP)', etc. The term 'relay' may be replaced with the term 'relay node (RN)', 'relay station (RS)', etc. The term 'terminal' may be replaced with the term 'user equipment (UE)', 'Mobile Station (MS)', 'Mobile Subscriber Station (MSS)', 'subscriber station (SS)', etc.

Specific terms used in the following description are provided for better understanding of the present invention, and these terms may be replaced with other terms within the scope and spirit of the present invention.

The embodiments of the present invention can be supported by standard documents disclosed for at least one of wireless access systems such as Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts which are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA, and employs OFDMA for downlink (DL) and SC-FDMA for uplink (UL). LTE-A is an evolved version of 3GPP LTE.

For clarity of explanation, the following description focuses on the 3GPP LTE/LTE-A system. However, the technical features of the present invention are not limited thereto.

1. Overview of 3GPP LTE/LTE-A System to which Present Invention is Applicable 1.1. System Overview FIG. 1 illustrates physical channels used in the 3GPP LTE system and a general signal transmission method using the same.

When a UE is powered on or enters a new cell, the UE performs initial cell search, for example, synchronization with an eNB, in step S11. To this end, the UE may be synchronized with the eNB and acquire information such as a cell identifier (ID) by receiving a primary synchronization channel (P-SCH) and a secondary synchronization channel (S-SCH) from the eNB.

After that, the UE may acquire broadcast information in a cell by receiving a physical broadcast channel (PBCH) from the eNB. In the mean time, the UE may check a DL channel status by receiving a downlink reference signal (DL RS) during initial cell search.

After initial cell search, the UE may acquire detailed system information by receiving a physical downlink control channel (PDCCH) and receiving a physical downlink shared channel (PDSCH) based on information of the PDCCH in step S12.

Then, the UE may perform a random access procedure to access the eNB in steps S13 to S16. To this end, the UE may transmit a preamble via a physical random access channel (PRACH) (S13) and receive a response message to the preamble via a PDCCH and a PDSCH corresponding to the PDCCH (S14). In the case of contention-based random access, the UE may perform a contention resolution procedure by further transmitting the PRACH (S15) and receiving a PDCCH and a PDSCH corresponding to the PDCCH (S16).

After the above-described procedure, the UE may receive a PDCCH and/or a PDSCH (S17) and transmit a physical uplink shared channel (PUSCH) and/or a physical uplink control channel (PUCCH) (S18), as a general DL/UL signal transmission procedure.

Control information transmitted from the UE to the eNB is called uplink control information (UCI). The UCI may include a hybrid automatic repeat and request acknowledgement/negative-acknowledgement (HARQ ACK/NACK) signal, a scheduling request (SR), a channel quality indicator (CQI), a precoding matrix index (PMI), a rank indicator (RI), etc.

Although the UCI is periodically transmitted via a PUCCH in general in the LTE system, it may be transmitted via a PUSCH when control information and traffic data need to be transmitted simultaneously. The UCI may be aperiodically transmitted via a PUSCH upon a request/instruction of a network.

Figure 2:
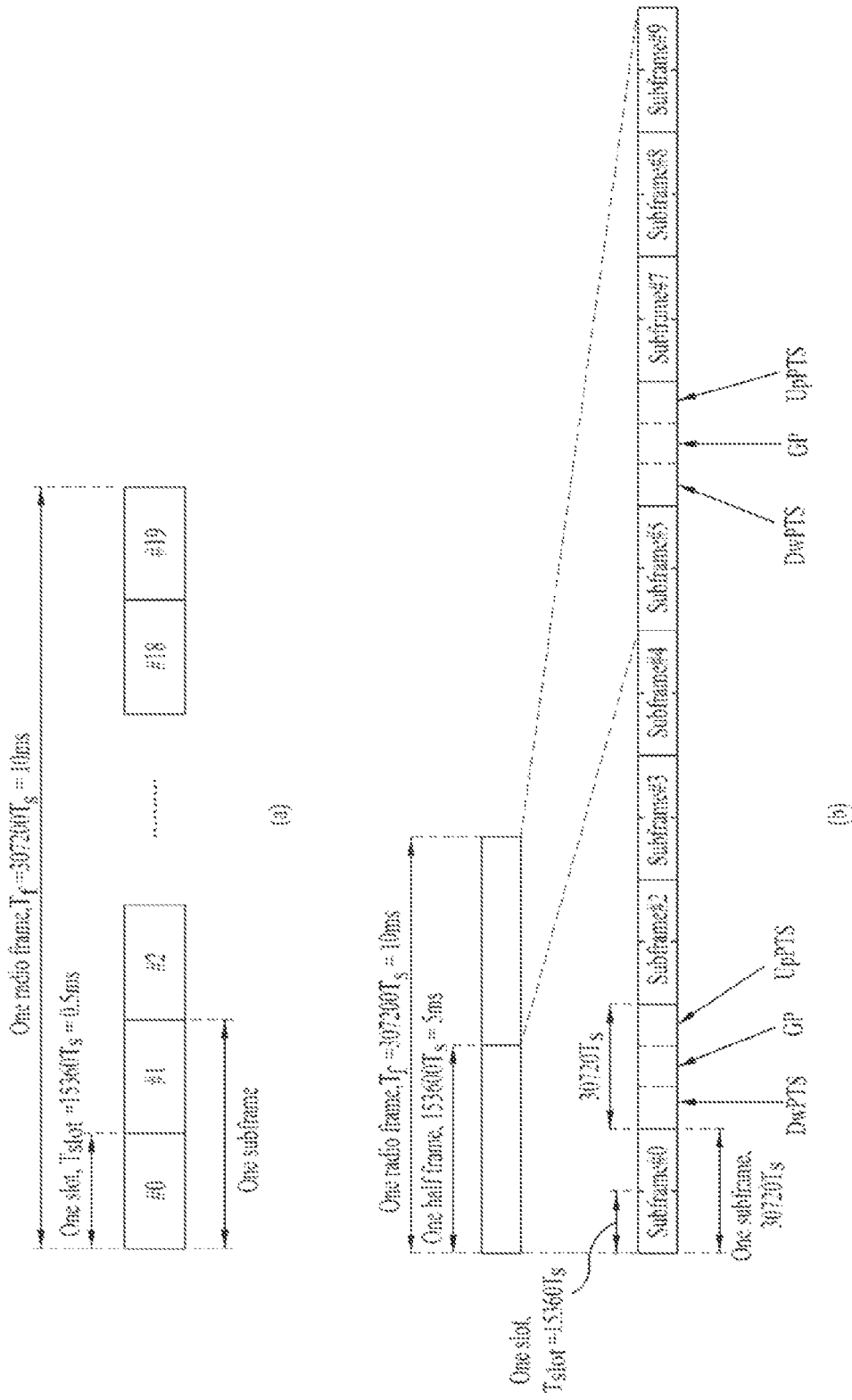
FIG. 2 illustrates a radio frame structure in the 3GPP LTE system.

FIG. 2 illustrates a radio frame structure in the 3GPP LTE system.

FIG. 2(a) illustrates frame structure type 1. Frame structure type 1 is applicable to both a full duplex frequency division duplex (FDD) system and a half duplex FDD system.

One radio frame has a length of $T_f=307200 \cdot T_s=10$ ms includes 20 slots having an equal length of $T_{slot}=15360 \cdot T_s=0.5$ ms and indexed from 0 to 19. One subframe is defined as 2 sequential slots, and an $i^{th}$ subframe includes $2i^{th}$ and $(2i+1)^{th}$ slots. That is, a radio frame includes 10 subframes. A time taken to transmit one subframe is referred to as a transmission time interval (TTI). Here, Ts is a sampling time satisfying $Ts=1/(15 \text{ kHz} \times 2048)=3.2552 \times 10^{-8}$ (about 33 ns). A slot includes a plurality of orthogonal frequency division multiplexing (OFDM) symbols or SC-FDMA symbols in the time domain, and includes a plurality of resource blocks (RBs) in the frequency domain.

One slot includes a plurality of OFDM symbols in the time domain. Since OFDMA is adopted for DL in the 3GPP LTE system, the OFDM symbol is used to indicate one symbol period. An OFDM symbol may be called an SC-FDMA symbol or symbol period. An RB is a resource assignment unit including a plurality of contiguous subcarriers in one slot.

In a full duplex FDD system, 10 subframes may be used simultaneously for DL transmission and UL transmission during each 10 ms period. In this case, UL transmission and DL transmission are distinguished in the frequency domain. On the other hand, a UE may not perform transmission and reception simultaneously in a half FDD system.

FIG. 2(b) illustrates frame structure type 2. Frame structure type 2 is applied to a time division duplex (TDD) system. One radio frame has a length of $T_f=307200 \cdot T_s=10$ ms and includes 2 half-frames each having a length of $153600 \cdot T_s=5$ ms. Each half-frame includes 5 subframes each having a length of $30720 \cdot T_s=1$ ms. An $i^{th}$ subframe includes $2i^{th}$ and $(2i+1)^{th}$ slots each having a length of $T_{slot}=15360 \cdot T_s=0.5$ ms. Here, Ts is a sampling time satisfying Ts=1/(15 kHz×2048)=3.2552× 10-8 (about 33 ns).

A type- frame includes a special subframe having three fields such as Downlink Pilot Time Slot (DwPTS), Guard Period (GP), and Uplink Pilot Time Slot (UpPTS). Here, the DwPTS is used for initial cell search, synchronization, or channel estimation at a UE. The UpPTS is used for channel estimation and UL transmission synchronization with a UE at an eNB. The GP is a period used to cancel UL interference between UL and DL, caused by a multi-path delay of a DL signal.

Table 1 shows special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is merely an example, and the number of subframes included in a radio frame, the number of slots included in a subframe, or the number of symbols included in a slot may be changed in various ways.

Figure 3:
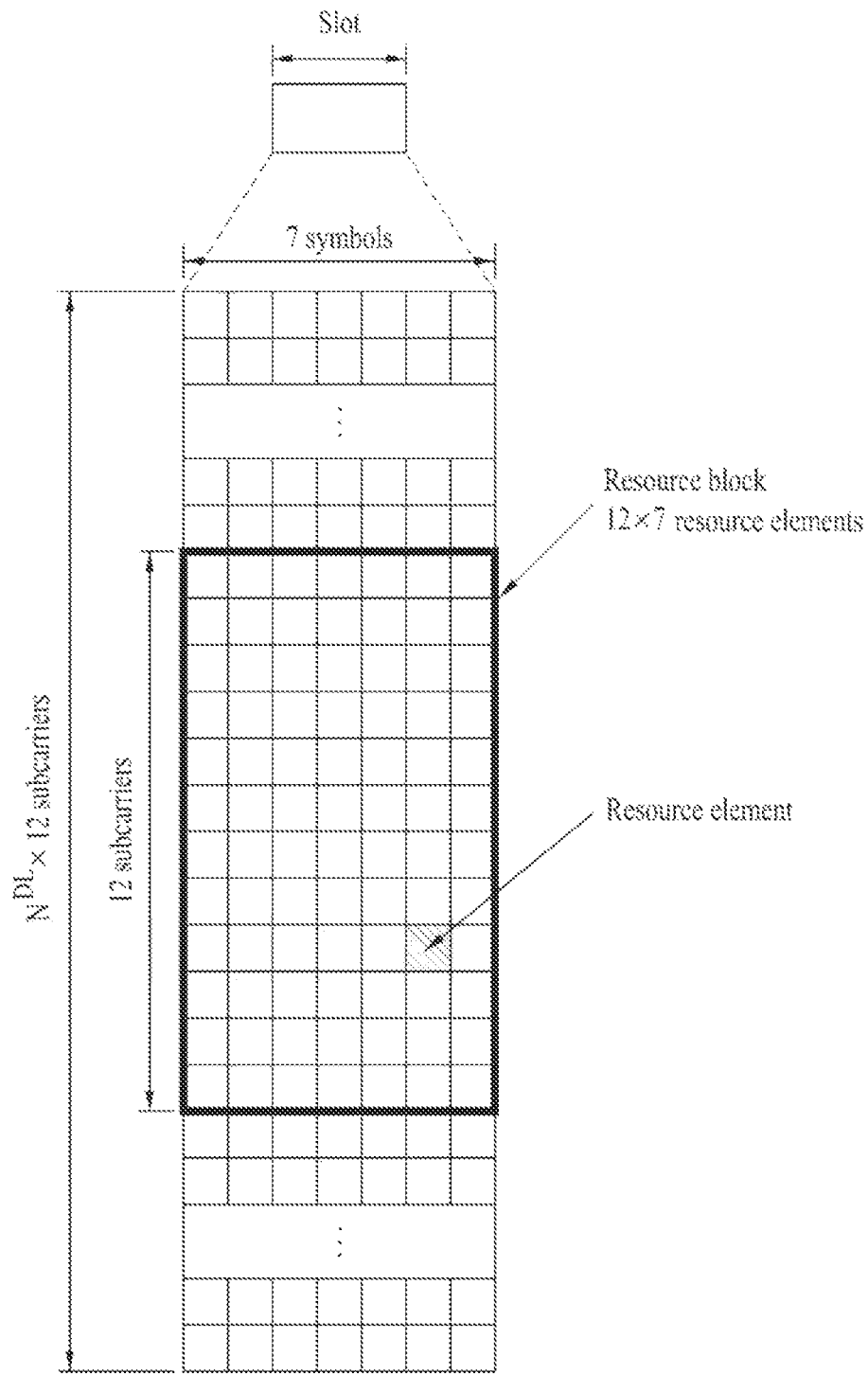
FIG. 3 exemplarily illustrates a resource grid for one downlink (DL) slot.

FIG. 3 exemplarily illustrates a resource grid for one DL slot.

Referring to FIG. 3, one DL slot includes a plurality of OFDM symbols in the time domain. One DL slot includes 7 OFDM symbols in the time domain and one RB includes 12 subcarriers in the frequency domain in FIG. 3, but the number of OFDM symbols and the number of subcarriers are not limited thereto.

Each element of the resource grid is referred to as a resource element (RE), and one RB includes 12×7 REs. The number NDL of RBs included in a DL slot depends on a DL transmission bandwidth. A UL slot may have the same structure as the DL slot.

Figure 4:
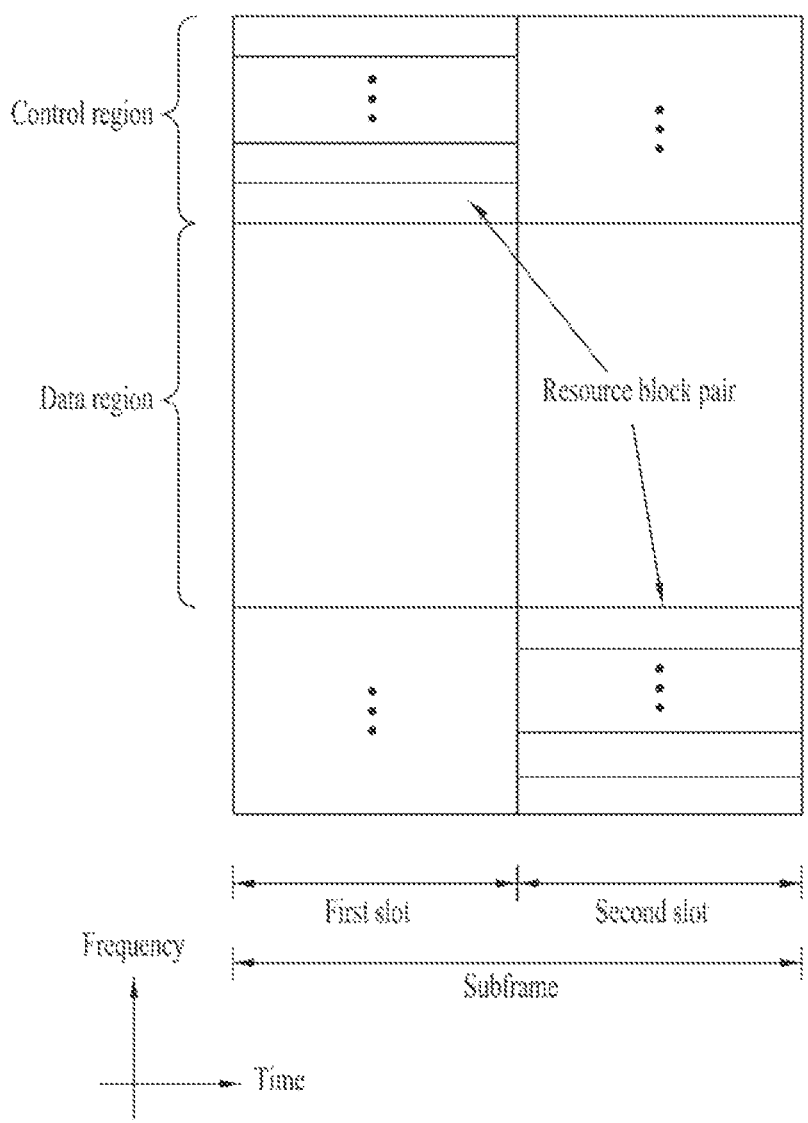
FIG. 4 illustrates an uplink (UL) subframe structure.

FIG. 4 illustrates a UL subframe structure.

Referring to FIG. 4, a UL subframe may be divided into a control region and a data region in the frequency domain. A physical uplink control channel (PUCCH) carrying UCI is allocated to the control region, and a physical uplink shared channel (PUSCH) carrying user data is allocated to the data region. To maintain single carrier property, one UE does not transmit a PUSCH and a PUCCH simultaneously. A PUCCH for one UE is allocated to an RB pair in a subframe. The RBs of the RB pair occupy different subcarriers in two slots. This is said that the RB pair allocated to the PUCCH is frequency-hopped over a slot boundary.

Figure 5:
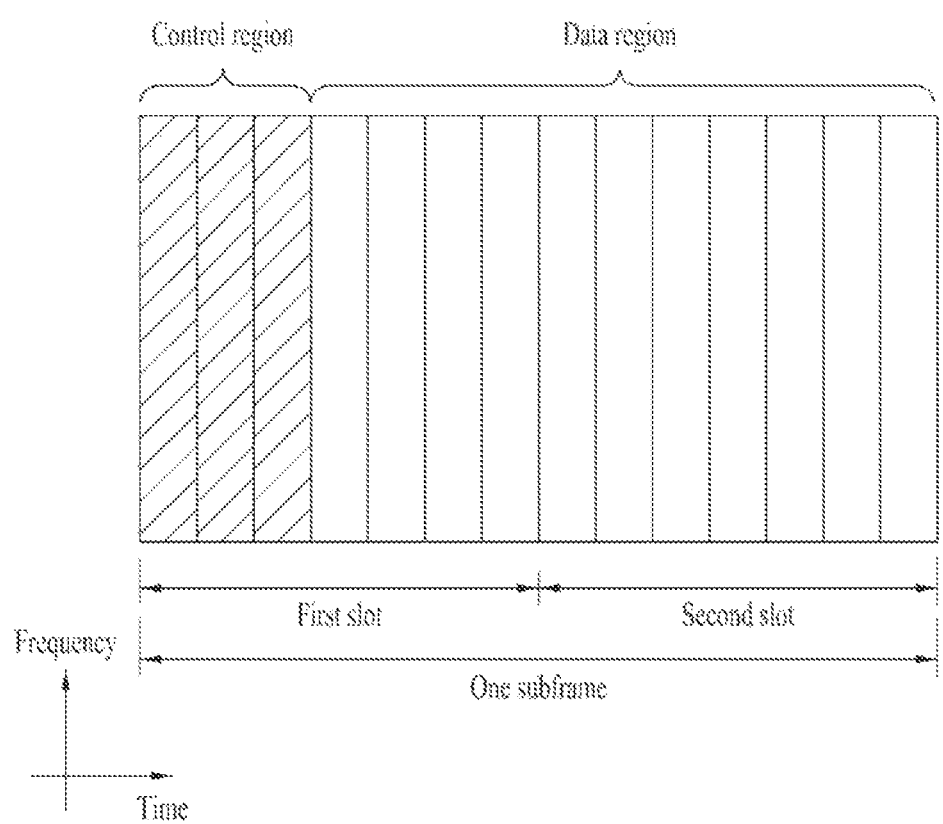
FIG. 5 illustrates a DL subframe structure.

FIG. 5 illustrates a DL subframe structure.

Up to 3 OFDM symbols at a front part of the first slot in a DL subframe correspond to a control region to which control channels are allocated, and the other OFDM symbols of the DL subframe correspond to a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH).

The PCFICH is transmitted in the first OFDM symbol of a subframe, and delivers information about the number of OFDM symbols used for transmission of control channels in the subframe (that is, the size of the control region). The PHICH is a response channel to UL transmission and delivers a HARQ acknowledgment/negative-acknowledgment (ACK/NACK) signal. Control information transmitted via the PDCCH is called downlink control information (DCI). The DCI includes UL resource assignment information (UL grant), DL resource assignment information (DL grant), or a UL transmit (Tx) power control command for an arbitrary UE group.

1.2. Physical Downlink Control Channel (PDCCH)

1.2.1. PDCCH Overview

The PDCCH may deliver information about resource assignment and a transmission format for a downlink shared channel (DL-SCH) (i.e. a DL grant), information about resource assignment and a transmission format for an uplink shared channel (UL-SCH) (i.e. a UL grant), paging information of a paging channel (PCH), system information on the DL-SCH, information about resource assignment for a higher layer control message such as a random access response transmitted via the PDSCH, a set of Tx power control (TPC) commands for individual UEs of an arbitrary UE group, Voice over Internet Protocol (VoIP) activation indication information, etc. A plurality of PDCCHs may be transmitted in the control region. A UE may monitor a plurality of PDCCHs. A PDCCH includes aggregation of one or more sequential control channel elements (CCEs). A PDCCH composed of aggregation of one or more sequential CCEs may be transmitted in the control region after being subblock-interleaved. A CCE is a logical allocation unit used to provide a code rate according to the state of a radio channel, to a PDCCH. A CCE corresponds to a plurality of RE Groups (REGs). The format of a PDCCH and the number of available bits for the PDCCH are determined according to the correlation between the number of CCEs and a code rate provided by the CCEs.

1.2.2. PDCCH Structure

A plurality of PDCCHs for a plurality of UEs may be multiplexed and transmitted in the control region. A PDCCH is composed of aggregation of one or more sequential CCEs. A CCE refers to a unit corresponding to a set of 9 REGs each including 4 REs. Four quadrature phase shift keying (QPSK) symbols are mapped to each REG. REs occupied by RSs are excluded from REGs. That is, a total number of REGs in an OFDM symbol may be changed depending on whether a cell-specific RS exists. The concept of an REG to which four REs are mapped is equally applicable to other downlink control channels (e.g. PCFICH or PHICH). If the number of REGs not allocated to the PCFICH or the PHICH is $N_{REG}$, the number of CCEs usable by the system is $N_{CCE}=\lfloor N_{REG}/9 \rfloor$ and the CCEs are indexed from 0 to $N_{CCE}-1$.

To simplify a decoding process of a UE, a PDCCH format including n CCEs may start with a CCE having an index equal to a multiple of n. That is, if the CCE index is i, the PDCCH format may start with a CCE satisfying i mod n=0

An eNB may configure one PDCCH using {1, 2, 4, 8} CCEs. In this case, {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness. In addition, the power level of the PDCCH may be controlled according to the channel state.

Table 2 shows PDCCH formats. 4 PDCCH formats are supported according to CCE aggregation levels as shown in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or modulation and coding scheme (MCS) level of control information delivered via a PDCCH is different. An MCS level refers to a code rate used for data coding and a modulation order. An adaptive MCS level is used for link adaptation. In general, 3 or 4 MCS levels may be considered for control channels carrying control information.

Regarding the formats of control information, control information transmitted via a PDCCH is called DCI. The configuration of information in PDCCH payload may be changed depending on the DCI format. The PDCCH payload refers to information bits. Table 3 shows DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |

TABLE 3-continued

| DCI Format | Description |
| --- | --- |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 3, the DCI formats include format 0 for PUSCH scheduling, format 1 for single-codeword PDSCH scheduling, format 1A for compact single-codeword PDSCH scheduling, format 1C for very compact DL-SCH scheduling, format 2 for PDSCH scheduling in a closed-loop spatial multiplexing mode, format 2A for PDSCH scheduling in an open-loop spatial multiplexing mode, and format 3/3A for transmission of TPC commands for UL channels. DCI format 1A may be used for PDSCH scheduling irrespective of the transmission mode of a UE.

The length of PDCCH payload may be changed depending on the DCI format. In addition, the type and length of PDCCH payload may be changed depending on compact or non-compact scheduling or the transmission mode of a UE.

The transmission mode of a UE may be configured to receive downlink data via a PDSCH. For example, downlink data carried on a PDSCH includes scheduled data, a paging message, a random access response, broadcast information on a broadcast control channel (BCCH), etc. for a UE. The downlink data of the PDSCH is related to a DCI format signaled using a PDCCH. The transmission mode of the UE may be configured semi-statically through higher layer signaling (e.g. radio resource control (RRC) signaling). The transmission mode may be classified as single antenna transmission or multi-antenna transmission. A transmission mode is configured for a UE semi-statically through higher layer signaling. For example, a multi-antenna transmission scheme may include transmit diversity, open-loop or closed-loop spatial multiplexing, Multi-User Multiple Input Multiple Output (MU-MIMO), or beamforming. Transmit diversity is a technique capable of increasing transmission reliability by transmitting the same data through multiple Tx antennas. Spatial multiplexing is a technique capable of achieving high-speed data transmission without increasing a system bandwidth by simultaneously transmitting different data through multiple Tx antennas. Beamforming is a technique capable of increasing the signal to interference plus noise ratio (SINR) of a signal by weighting multiple antennas according to channel states.

A DCI format depends on the transmission mode of a UE. That is, the UE has a reference DCI format monitored according to the transmission mode configured for the UE. The UE may have the following 7 transmission modes.

(1) Single antenna port: port 0

(2) Transmit diversity (3) Open-loop spatial multiplexing (4) Closed-loop spatial multiplexing (5) MU-MIMO (6) Closed-loop rank=1 precoding (7) Single antenna port: port 5

1.2.3. PDCCH Transmission

An eNB determines a PDCCH format according to DCI to be transmitted to a UE and adds a cyclic redundancy check (CRC) to control information. The CRC is masked with a unique identifier (ID) (e.g. a radio network temporary identifier (RNTI)) according to an owner or usage of the PDCCH. If the PDCCH is directed to a specific UE, the CRC may be masked with a unique ID (e.g. a cell-RNTI (C-RNTI)) of the UE. If the PDCCH carries a paging message, the CRC may be masked with a paging indicator ID (e.g. a paging-RNTI (P-RNTI)). If the PDCCH carries system information, particularly, a system information block (SIB), the CRC may be masked with a system information ID (e.g. a system information RNTI (SI-RNTI)). To indicate a random access response to a random access preamble transmitted by the UE, the CRC may be masked with a random access-RNTI (RA-RNTI).

Subsequently, the eNB generates coded data by performing channel coding on the CRC-added control information. In this case, channel coding may be performed at a code rate corresponding to an MCS level. The eNB performs rate matching according to a CCE aggregation level allocated to a PDCCH format and generates modulation symbols by modulating the coded data. At this time, a modulation order corresponding to the MCS level may be used. The CCE aggregation level for the modulation symbols of one PDCCH may be one of 1, 2, 4, and 8. After that, the eNB maps the modulation symbols to physical REs (i.e. CCE to RE mapping).

1.2.4. Blind Decoding (BD)

A plurality of PDCCHs may be transmitted in one subframe. That is, the control region of one subframe includes a plurality of CCEs indexed from 0 to $N_{CCE,k}-1$. Here, $N_{CCE,k}$ refers to a total number of CCEs in the control region of a $k^{th}$ subframe. A UE monitors a plurality of PDCCHs in every subframe. Here, monitoring means that the UE attempts to decode each PDCCH according to a monitored PDCCH format. An eNB does not provide the UE with information about the position of a PDCCH directed to the UE in an allocated control region of a subframe. Without knowing the position, CCE aggregation level, or DCI format of the PDCCH, the UE searches for its PDCCH by monitoring a set of PDCCH candidates in the subframe in order to receive a control channel from the eNB. This is called blind decoding/detection. Blind decoding refers to a process that a UE de-masks a CRC part with its UE ID, checks a CRC error, and determines whether a corresponding PDCCH is a control channel directed to the UE.

The UE monitors a PDCCH in every subframe to receive data transmitted to the UE in an active mode. In a discontinuous reception (DRX) mode, the UE wakes up in a monitoring period of every DRX cycle and monitors a PDCCH in a subframe corresponding to the monitoring period. The PDCCH-monitored subframe is called a non-DRX subframe.

To receive a PDCCH directed to a UE, the UE should perform blind decoding on all CCEs of the control region of the non-DRX subframe. Without knowing a transmitted PDCCH format, the UE should decode all PDCCHs at all possible CCE aggregation levels until the UE succeeds in blind-decoding a PDCCH in every non-DRX subframe. Since the UE does not know the number of CCEs used by its PDCCH, the UE should attempt detection at all possible CCE aggregation levels until the UE succeeds in blind decoding of a PDCCH. That is, the UE performs blind decoding at every CCE aggregation level. In other words, the UE initially attempts decoding by setting the CCE aggregation level to 1. If decoding is all failed, the UE initially attempts decoding by setting the CCE aggregation level to 2. After that, the UE initially attempts decoding by setting the CCE aggregation level to 4 and then to 8. In addition, the UE attempts blind decoding with respect to all four of C-RNTI, P-RNTI, SI-RNTI, and RA-RNTI. Furthermore, the UE attempts blind decoding with respect to all DCI formats to be monitored.

If the UE attempts blind decoding with respect to all possible RNTIs, with respect to all DCI formats to be monitored, and at all CCE aggregation levels as described above, the number of detection attempts is excessively increased. As such, in the LTE system, the concept of search space (SS) is defined for blind decoding of a UE. An SS refers to a set of PDCCH candidates to be monitored by a UE, and may have a different size for each PDCCH format.

There are two types of SSs, e.g., common search space (CSS) and UE-specific/dedicated search space (USS). All UEs may know the size of a CSS, but a USS may be configured for each individual UE. Accordingly, a UE should monitor both a CSS and USS to decode a PDCCH, and thus performs blind decoding up to 44 times in one subframe. Here, the number of times that blind decoding is performed does not include blind decoding performed based on different CRC values (e.g., C-RNTI, P-RNTI, SI-RNTI, and RA-RNTI).

Due to a small SS, the eNB may not secure CCE resources for transmitting PDCCHs to all desired UEs in a given subframe. This is because resources remaining after CCE allocation may not be included in an SS of a specific UE. In order to minimize this obstacle that may continue in a next subframe, a UE-specific hopping sequence may be applied to a starting point of a USS.

Table 4 shows the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search simultaneously for all defined DCI formats. Specifically, the UE always searches for DCI formats 0 and 1A in a USS. Although DCI formats 0 and 1A have the same size, the UE may distinguish the DCI formats using a flag for format 0/format 1A differentiation included in a PDCCH. Other DCI formats than DCI formats 0 and 1A, for example, DCI formats 1, 1B, and 2, may be required by the UE according to a PDSCH transmission mode configured by the eNB.

The UE may search for DCI formats 1A and 1C in a CSS. The UE may also be configured to search for DCI format 3 or 3A in the CSS. Although DCI formats 3 and 3A have the same size as DCI formats 0 and 1A, the UE may distinguish the DCI formats using a CRC scrambled with an ID other than a UE-specific ID.

An SS $S_k^{(L)}$ refers to a PDCCH candidate set according to a CCE aggregation level $L \in \{1,2,4,8\}$. CCEs according to a PDCCH candidate set m in the SS may be determined as shown in Equation 1.

$$L \cdot \{(Y_k + m) \bmod \lfloor N_{CCE,k}/L \rfloor\} + i \qquad \text{[Equation 1]}$$

In Equation 1, $M^{(L)}$ is the number of PDCCH candidates according to a CCE aggregation level L to be monitored in the SS, and m=0, ..., $M^{(L)}-1$. i is the index of an individual CCE in each PDCCH candidate, and i=0, ..., L−1.

As described before, the UE monitors both the USS and CSS to decode a PDCCH. Here, the CSS supports PDCCHs having CCE aggregation levels {4, 8} and the USS supports PDCCHs having CCE aggregation levels {1, 2, 4, 8}.

Table 5 shows PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, for two aggregation levels, L=4 and L=8, $Y_k$ is set to 0 in the CSS. On the other hand, $Y_k$ is defined as shown in Equation 2 for an aggregation level L in the USS.

$$Y_k = (A \cdot Y_{k-1}) \bmod D \quad \text{[Equation 2]}$$

In Equation 2, $Y_{-1} = n_{RNTI} \neq 0$, and $n_{RNTI}$ indicating an RNTI value may be defined as one of UE IDs. In addition, A=39827, D=65537, and k=$\lfloor n_s/2 \rfloor$. $n_s$ denotes a slot number (or index) in a radio frame.

1.3. Carrier Aggregation (CA) Environment 1.3.1. CA Overview

Communication environments considered in embodiments of the present invention include all multi-carrier resource environments. That is, the term 'multi-carrier system' or 'CA system' used in the present invention refers to a system that uses aggregation of one or more CCs having a smaller bandwidth than a target bandwidth when configuring a target wideband to support the wideband.

In the present invention, multi-carrier means CA. In this case, CA covers aggregation of contiguous carriers and aggregation of non-contiguous carriers. The number of aggregated CCs may be different for DL and UL. If the number of DL CCs is equal to the number of UL CCs, this is called symmetric aggregation. If the number of DL CCs is different from the number of UL CCs, this is called asymmetric aggregation. The term 'CA' may be interchanged with bandwidth aggregation, spectrum aggregation, etc.

The LTE-A system aims to support a bandwidth of up to 100 MHz by aggregating two or more CCs, that is, by CA. To achieve backward compatibility with the legacy IMT system, each of one or more carriers, which has a smaller bandwidth than a target bandwidth, may be limited to a bandwidth used in the legacy system. For example, the legacy 3GPP LTE system supports {1.4, 3, 5, 10, 15, 20} MHz bandwidths and the 3GPP LTE-A system may support a broader bandwidth than 20 MHz using only these LTE bandwidths. A CA system of the present invention may support CA by defining a new bandwidth irrespective of the bandwidths used in the legacy system.

The LTE-A system adopts the concept of cell to manage radio resources. The above-described CA environment may be referred to as a multi-cell environment. A cell is defined as a pair of DL resources (DL CC) and UL resources (UL CC), but the UL resources are not mandatory. Accordingly, a cell may be configured with DL resources alone or DL and UL resources. If one serving cell is configured for a specific UE, the UE may have one DL CC and one UL CC. However, if two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported. In other words, CA may be regarded as aggregation of two or more cells having different carrier frequencies (center frequencies). Here, the term 'cell' should be distinguished from 'cell' as an area covered by an eNB.

In the LTE-A system, a primacy cell (PCell) and a secondary cell (SCell) are used. A PCell and SCell may be used as serving cells. For a UE in the RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells including a PCell and one or more SCells may exist for the UE.

Serving cells (PCell and SCell) may be configured using an RRC parameter. PhysCellId is a physical-layer ID of a cell and has an integer value from 0 to 503. SCellIndex is a short ID of an SCell and has an integer value from 1 to 7. ServeCellIndex is a short ID of a serving cell (PCell or SCell) and has an integer value from 1 to 7. A value 0 is applied to a PCell and the values of SCellIndex are previously given to be applied to SCells. That is, the lowest cell ID (or cell index) of ServeCellIndex indicates a PCell.

A PCell refers to a cell operating with a primary frequency (or primary CC). The PCell may be used when a UE performs initial connection establishment or connection re-establishment, and may indicate a cell designated during a handover procedure. In addition, the PCell refers to a main cell for control-related communication among serving cells configured in a CA environment. That is, the UE may receive assignment of and transmit a PUCCH only in its PCell, and may use only the PCell to acquire system information or change a monitoring procedure. An Evolved Universal Terrestrial Radio Access Network (E-UTRAN) may change only a PCell for a handover procedure using a higher layer RRC connection reconfiguration message including mobility control information to a UE supporting CA.

An SCell may refer to a cell operating with a secondary frequency (or secondary CC). One or more SCells may be allocated to a specific UE while only one PCell is allocated to the UE. An SCell may be configured after RRC connection is established and may be used to provide additional radio resources. There is no PUCCH in cells other than a PCell, that is, in SCells, among serving cells configured in the CA environment.

When the E-UTRAN adds an SCell to a UE supporting CA, the E-UTRAN may transmit every system information related to operations of related cells in RRC_CONNECTED state to the UE through dedicated signaling. Changing of the system information may be controlled by releasing and adding a related SCell. In this case, a higher layer RRC connection reconfiguration message may be used. The E-UTRAN may not transmit a broadcast signal but transmit a dedicated signal having a different parameter for each UE in a related SCell.

After an initial security activation procedure starts, the E-UTRAN may configure a network including one or more SCells in addition to a PCell initially configured during a connection establishment procedure. In the CA environment, each of a PCell and SCell may operate as a CC. A primary CC (PCC) may be used in the same meaning as a PCell and a secondary CC (SCC) may be used in the same meaning as an SCell in the following embodiments of the present invention.

Figure 6:
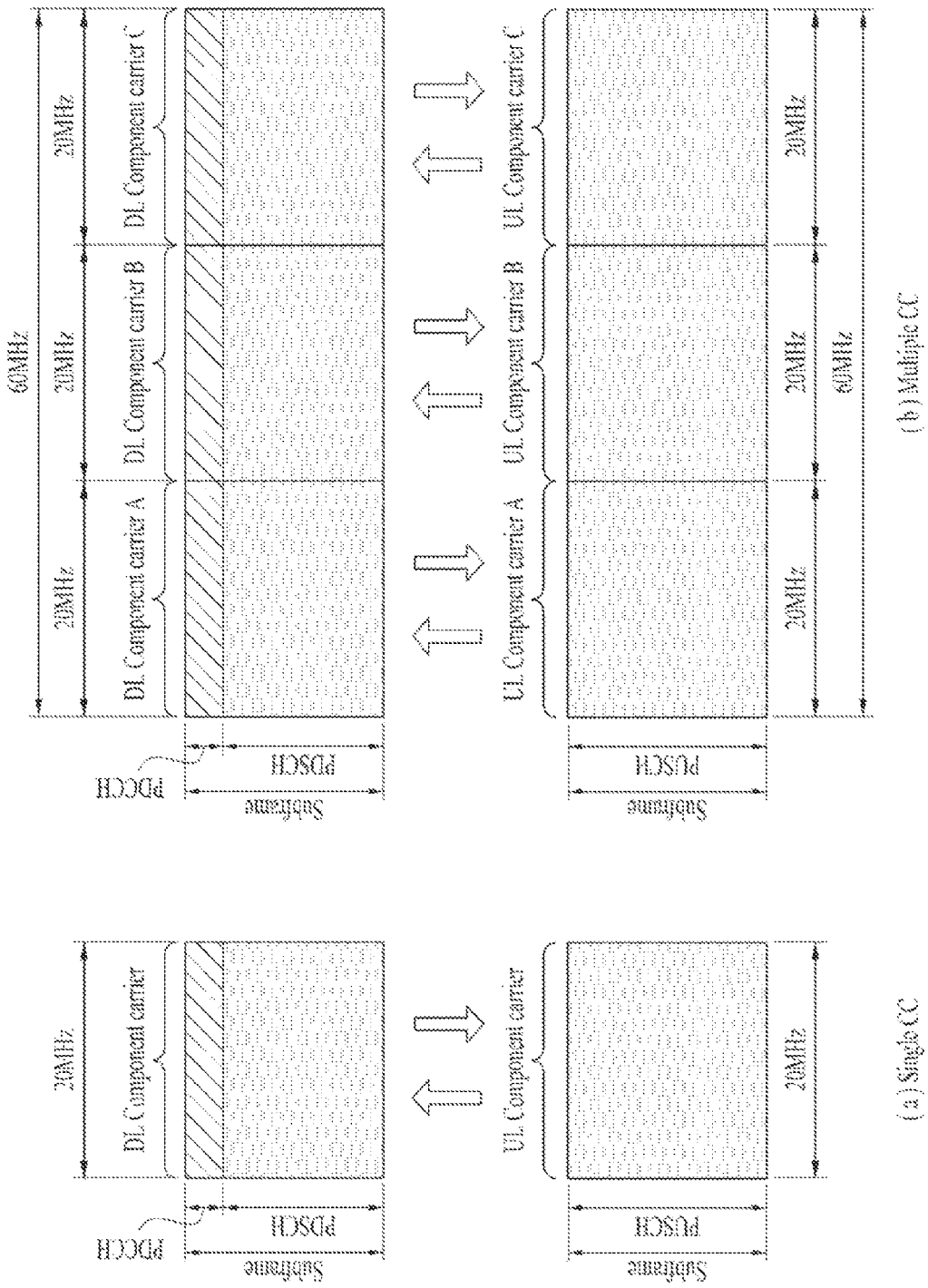
FIG. 6 exemplarily illustrates component carriers (CCs) in the LTE system and carrier aggregation (CA) used in the LTE-Advanced (LTE-A) system.

FIG. 6 exemplarily illustrates CCs in the LTE system and CA used in the LTE-A system.

FIG. 6(a) illustrates a single carrier structure used in the LTE system. CCs include a DL CC and UL CC. One CC may have a frequency range of 20 MHz.

FIG. 6(b) illustrates a CA structure used in the LTE-A system. In FIG. 6(b), three CCs each having a frequency size of 20 MHz are aggregated. Although three DL CCs and three UL CCs are illustrated, there is no limitation in the number of DL CCs and the number of UL CCs. In CA, a UE may monitor three CCs simultaneously, receive a DL signal/data, and transmit a UL signal/data.

If a specific cell manages N DL CCs, a network may allocate M (M≤N) DL CCs to a UE. The UE may monitor only the M DL CCs and receive a DL signal. In addition, the network may give priority to L (L≤M≤N) DL CCs and allocate a main DL CC to the UE. In this case, the UE should monitor the L DL CCs. This scheme may be equally applied to UL transmission.

Linkage between the carrier frequencies of DL resources (or DL CCs) and the carrier frequencies of UL resources (or UL CCs) may be indicated using a higher layer message such as an RRC message, or system information. For example, a set of DL resources and UL resources may be configured by linkage defined by system information block type 2 (SIB2). Specifically, the linkage may refer to a mapping relationship between a DL CC for transmitting a PDCCH carrying a UL grant and a UL CC using the UL grant, or a mapping relationship between a DL CC (or UL CC) for transmitting HARQ data and a UL CC (or DL CC) for transmitting a HARQ ACK/NACK signal.

1.3.2. Cross Carrier Scheduling

Two scheduling schemes, e.g., self-scheduling and cross carrier scheduling, are defined for a CA system in view of carriers or serving cells. Cross carrier scheduling may be called cross component carrier scheduling or cross cell scheduling.

In self-scheduling, a PDCCH (DL grant) and a PDSCH are transmitted in the same DL CC or a PUSCH is transmitted in a UL CC linked to a DL CC in which a PDCCH (UL grant) is received.

In cross carrier scheduling, a PDCCH (DL grant) and a PDSCH are transmitted in different DL CCs or a PUSCH is transmitted in a UL CC other than a UL CC linked to a DL CC in which a PDCCH (UL grant) is received.

Cross carrier scheduling may be activated or inactivated UE-specifically and indicated to each UE semi-statically through higher layer signaling (e.g. RRC signaling).

If cross carrier scheduling is activated, a PDCCH requires a carrier indicator field (CIF) to indicate a DL/UL CC in which a PDSCH/PUSCH indicated by the PDCCH is to be transmitted. For example, the PDCCH may allocate PDSCH resources or PUSCH resources to one of a plurality of CCs using the CIF. That is, when a PDCCH of a DL CC allocates PDSCH or PUSCH resources to one of aggregated DL/UL CCs, the CIF is configured. In this case, the DCI formats of LTE Release-8 may be extended according to the CIF. The configured CIF may be fixed to a 3-bit field and the position of the CIF may be fixed irrespective of a DCI format size. In addition, the PDCCH structure of LTE-A Release-8 (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not configured. In this case, the PDCCH structure of and LTE-A Release-8 (the same coding and resource mapping based on the same CCEs) and the DCI formats may be used.

When cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may includes at least one of the DL CCs in the UE DL CC set. Alternatively, the PDCCH monitoring set may be defined irrespective of the UE DL CC set. DL CCs included in the PDCCH monitoring set may be configured to always enable self-scheduling for UL CCs linked to the DL CCs. The UE DL CC set, UE UL CC set, and PDCCH monitoring set may be configured UE-specifically, UE group-specifically, or cell-specifically.

If cross carrier scheduling is inactivated, this means that the PDCCH monitoring set is always identical to the UE DL CC set. In this case, no indication, for example, additional signaling, is needed for the PDCCH monitoring set. However, if cross carrier scheduling is activated, the PDCCH monitoring set may be preferably defined within the UE DL CC set. That is, an eNB transmits a PDCCH only in the PDCCH monitoring set to schedule a PDSCH or PUSCH for the UE.

Figure 7:
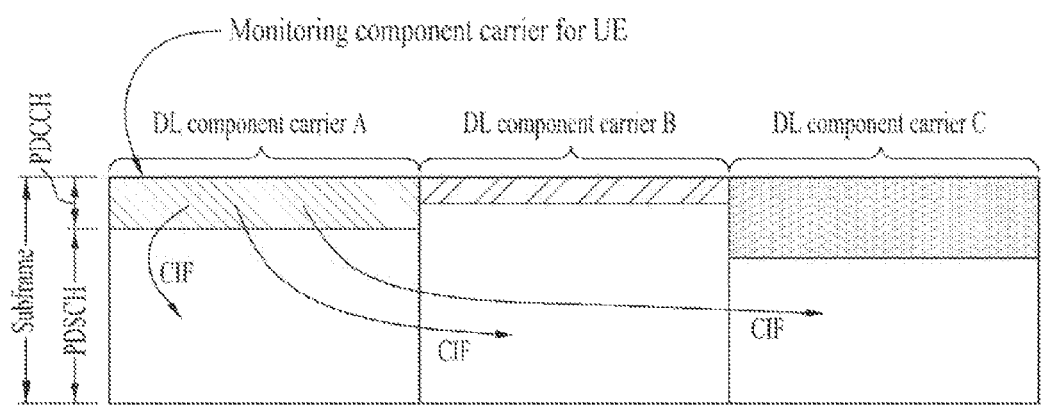
FIG. 7 illustrates a subframe structure of the LTE-A system according to cross carrier scheduling.

FIG. 7 illustrates a subframe structure of the LTE-A system according to cross carrier scheduling.

Referring to FIG. 7, three DL CCs are aggregated in a DL subframe for an LTE-A UE. DL CC 'A' is configured as a PDCCH monitoring DL CC. If a CIF is not used, each DL CC may transmit a PDCCH that schedules a PDSCH in the same DL CC 'A' without the CIF. On the other hand, if the CIF is used through higher layer signaling, only one DL CC 'A' may transmit a PDCCH that schedules a PDSCH in the same DL CC 'A' or another CC. In this case, no PDCCH is transmitted in DL CCs 'B' and 'C' not configured as
PDCCH monitoring DL CCs.

1.4. Overview of UL/DL Scheduling in TDD System
1.4.1. UL-DL Configurations in TDD System UL-DL configurations for frame structure type 2 correspond to rules of allocating (or reserving) all subframes or DL and UL. Table 6 shows the UL-DL configurations.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 6, "D" represents a DL subframe, "U" represents a UL subframe, and "S" represents a special subframe including a DwPTS, GP, and UpPTS, in a radio frame.

7 UL-DL configurations are available and have different locations or numbers of DL subframes, special subframes, and UL subframes.

A time point at which DL switches to UL or UL switches to DL is called a switching point. Switch-point periodicity refers to a period in which switching between a UL subframe and DL subframe is repeated in the same manner, and supports both 5 ms and 10 ms. If the switch-point periodicity is 5 ms, a special subframe S exists in every half-frame. If the switch-point periodicity is 10 ms, the special subframe S exists only in the first half-frame.

In every UL-DL configuration, subframes 0 and 5, and a DwPTS are periods for DL transmission, and a UpPTS and subframes immediately after special subframes are always periods for UL transmission.

The UL-DL configurations are system information that may be known to both an eNB and UEs. Whenever UL-DL configuration information is changed, the eNB may indicate the change in the UL-DL assignment state of a radio frame to a UE by transmitting only the index of configuration information. The configuration information is a kind of DCI and may be transmitted via a downlink control channel such as a PDCCH like other scheduling information. The configuration information may be broadcasted commonly to all UEs within a cell via a broadcast channel. The number of half-frames included in a radio frame, the number of subframes included in a half-frame, and DL-UL subframe combinations in the TDD system above are merely exemplary.

1.4.2. UL/DL Scheduling in TDD System

A DL/UL subframe configuration is different according to a UL-DL configuration in the TDD system. Accordingly, transmission timings of a PUSCH and PHICH may be different according to a configuration and a subframe index (or number).

In the LTE system, a UL/DL timing relationship among a PUSCH, a PDCCH prior to the PUSCH, and a PHICH for transmitting DL HARQ ACK/NACK and corresponding to the PUSCH is previously determined Table 7 shows transmission timings of a PDCCH and a PUSCH corresponding to the PDCCH for each UL-DL configuration.

TABLE 7

| TDD UL/DL Configuration | \multicolumn{10}{c}{subframe number n} | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 6 | | | | 4 | 6 | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | 7 | 7 | | | | 5 |

Referring to Table 7, in UL-DL configurations 1 to 6, for retransmission after receiving a UL grant via a PDCCH or receiving a PHICH from an eNB in an $n^{th}$ DL subframe, a UE transmits a PUSCH in an $(n+k)^{th}$ UL subframe according to the index of the DL subframe in which the PDCCH (or PHICH) is transmitted. In this case, the value k is as shown in Table 7.

In UL-DL configuration 0, a PUSCH may be transmitted in a UL subframe indicated by Table 7, in an $(n+7)^{th}$ UL subframe, or both, according to a UL index in a UL DCI format, the index of a DL subframe for transmitting a PHICH, and the value of $I_{PHICH}$ received through higher layer signaling or determined according to the index of a UL subframe for transmitting a PUSCH.

If a UE receives a PHICH carrying HARQ ACK/NACK in DL subframe i from an eNB, the PHICH corresponds to a PUSCH transmitted by the UE in UL subframe i-k. In this case, the value k is as shown in Table 8.

Table 8 shows a transmission timing relationship between a PUSCH and a PHICH corresponding to the PUSCH in each UL-DL configuration.

TABLE 8

| TDD UL/DL Configuration | \multicolumn{10}{c}{subframe number i} | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

In UL-DL configurations 1 to 6, or in UL-DL configuration 0 where $I_{PHICH}=0$, if a UE receives a PHICH carrying HARQ-ACK in subframe i from an eNB, the PHICH corresponds to a PUSCH transmitted by the UE in subframe i-k. On the other hand, in UL-DL configuration 0 where $I_{PHICH}=1$, if the UE receives a PHICH carrying HARQ-ACK in subframe i from the eNB, the PHICH corresponds to a PUSCH transmitted by the UE in subframe i-6.

After the UE transmits a transport block (TB) in a PUSCH subframe corresponding to DL subframe i to the eNB, if the UE receives a PHICH corresponding to the TB in DL subframe i to decode ACK, or if the TB is disabled due to a PDCCH transmitted in DL subframe i, the UE transmits ACK to a higher layer in response to the TB. Otherwise, NACK is transmitted to a higher layer in response to the TB.

As for the UE, an ACK/NACK response (or, PHICH) to UL transmission of the UE via a PUSCH in an $n^{th}$ UL subframe is transmitted from the eNB in an $(n+k)^{th}$ DL subframe corresponding to the index of the UL subframe. In the case of subframe bundling, the PHICH corresponds to the last subframe of a bundle. The UE has to find/detect/demodulate the PHICH by predicting that a PHICH response to the PUSCH transmitted by the UE is transmitted from the eNB in the $(n+k)^{th}$ DL subframe. In this case, the value k is as shown in Table 9.

Table 9 shows a transmission timing relationship between a PUSCH and a PHICH corresponding to the PUSCH in each UL-DL configuration.

TABLE 9

| TDD UL/DL Configuration | \multicolumn{10}{c}{subframe index n} | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

PHICH resources are identified using an index pair such as $(n_{PHICH}^{group}, n_{PHICH}^{seq})$. $n_{PHICH}^{group}$ denotes the index of a PHICH group, and $n_{PHICH}^{seq}$ denotes the index of an orthogonal sequence in the PHICH group. $n_{PHICH}^{group}$ and $n_{PHICH}^{seq}$ may be calculated as shown in Equation 3.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{[Equation 3]}$$

In Equation 3, $n_{DMRS}$ is mapped from a cyclic shift for a demodulation reference signal (DMRS) field in the most recent PDCCH having a UL DCI format for a TB associated with PUSCH transmission. On the other hand, when there is no PDCCH having a UL DCI format for the same TB, if an initial PUSCH for the same TB is scheduled semi-persistently persistently or scheduled by a random access response grant, $n_{DMRS}$ is set to 0.

$N_{SF}^{PHICH}$ indicates the size of a spreading factor used for PHICH modulation.

$I_{PRB\_RA}$ equals to $I_{PRB\_RA}^{lowest\_index}$ for the first TB of a PUSCH associated with a PDCCH or, when there is no associated PDCCH, if the number of TBs, which is manually perceived, is not equal to the number of TBs indicated by the most recent PDCCH associated with the corresponding PUSCH. On the other hand, $I_{PRB\_RA}$ equals to $I_{PRB\_RA}^{lowest\_index} + 1$ for the second TB of a PUSCH associated with a PDCCH. Here, $I_{PRB\_RA}^{lowest\_index}$ corresponds to the lowest PRB index of the first slot for corresponding PUSCH transmission.

$N_{PHICH}^{group}$ indicates the index of a PHICH group configured by a higher layer.

$I_{PHICH}$ has a value 1 if a PUSCH is transmitted in a subframe indexed 4 or 9 in UL-DL configuration 0 of the TDD system, and has a value 0 otherwise.

Table 10 shows a mapping relationship between a cyclic shift for a DMRS field and $n_{DMRS}$ used to determine PHICH resources in a PDCCH having a UL DCI format.

TABLE 10

| Cyclic Shift for DMRS Field in PD CCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

1.5. Heterogeneous Network

A heterogeneous network/deployment refers to a network structure in which micro cells for low-power/short-range communication coexist in a macro-cell-based homogeneous network. A macro cell (or macro eNB) has broad coverage and high Tx power and refers to a general cell (or eNB) in a wireless communication system. A micro cell (or micro eNB) is a mini version of the macro cell and refers to a cell (or eNB) capable of performing most functions of the macro cell, operating independently, and overlaid or non-overlaid on the coverage of the macro cell. The micro cell has smaller coverage and lower Tx power and manages a smaller number of UEs compared to the macro cell. The micro cell may be called a pico cell, femto cell, Home evolved Node B (HeNB), relay, etc.

A UE may be directly served by the macro cell or served by the micro cell. In some cases, a UE in the coverage of the micro cell may be served by the macro cell.

The micro cell may be classified into two types according to access limitations of the UE. The first type is a closed subscriber group (CSG) cell which does not allow access of either a legacy macro UE (i.e., a UE served by the macro cell) or other micro UEs (i.e., UEs served by the micro cell) without authentication. The second type is an open access subscriber group (OASC) or open subscriber group (OSC) cell which allows access of the legacy macro UE or other micro UEs.

In a heterogeneous network environment in which the macro and micro cells coexist, inter-cell interference may occur more seriously compared to a homogeneous network environment in which only macro or micro cells exist.

Figure 8:
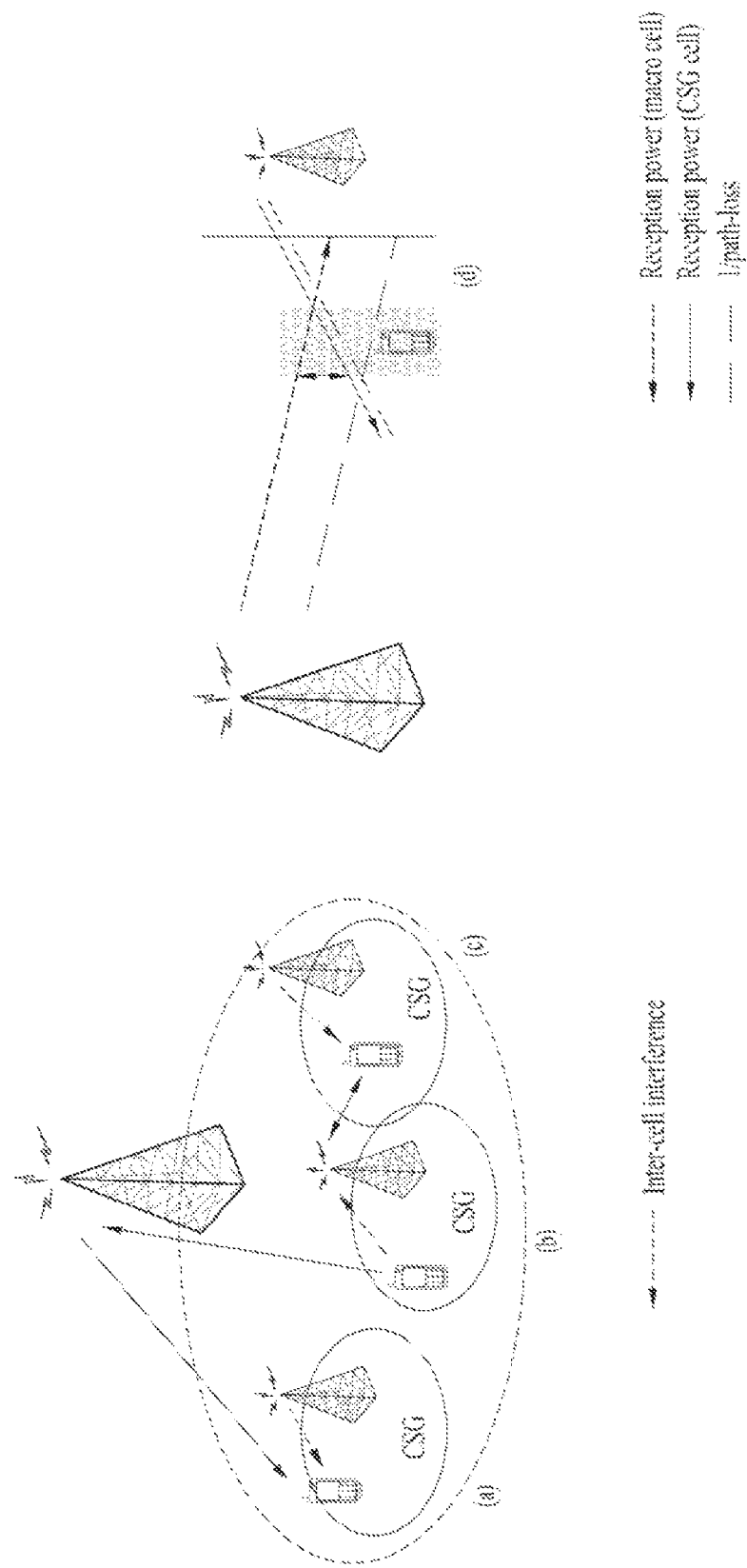
FIG. 8 exemplarily illustrates interference occurring in a heterogeneous network wireless communication system including a macro cell and micro cell.

FIG. 8 exemplarily illustrates interference occurring in a heterogeneous network wireless communication system including a macro cell and micro cell.

Referring to FIG. 8, case (a) shows that an HeNB causes interference to a macro UE not allowed to access a CSG cell. Case (b) shows that the macro UE causes serious interference toward the HeNB. Case (c) shows that another CSG cell causes interference to a CSG UE. In case (d), uplink transmission may be improved due to path loss based on cell association (e.g., due to use of a biased reference signal received power (RSRP) report), but DL interference of a UE other than the macro UE may increase at a cell edge.

The above cases show that not only UL and DL interference influenced on data but also layer 1 (L1)/layer 2 (L2) control signaling and methods for handling synchronization and reference signals are critical. These methods may operate in the time, frequency, and/or spatial domain.

In a macro-pico heterogeneous network, a macro cell may cause strong interference in a UE served by a pico cell, specifically, a UE located at an edge of a serving pico cell. As an example of time domain inter-cell interference coordination (ICIC), the macro cell which causes interference may provide a subframe called an almost blank subframe (ABS or ABSF) and the ABS or ABSF may not deliver any DL control channel or data channel other than a CRS, so that the UE may be protected from strong interference caused by the macro cell. If a primary synchronization sequence (PSS), secondary synchronization sequence (SSS), physical broadcast control channel (PBCH), system information block type 1 (SIB1), paging signal, and positioning reference signal (PRS) correspond to the ABS, the above information is transmitted in the ABS. In addition, if the ABS is identical to a multicast broadcast single frequency network (MBSFN) subframe for transmitting no signal in the data region, the CRS is not transmitted in the data region of the ABS.

Figure 9:
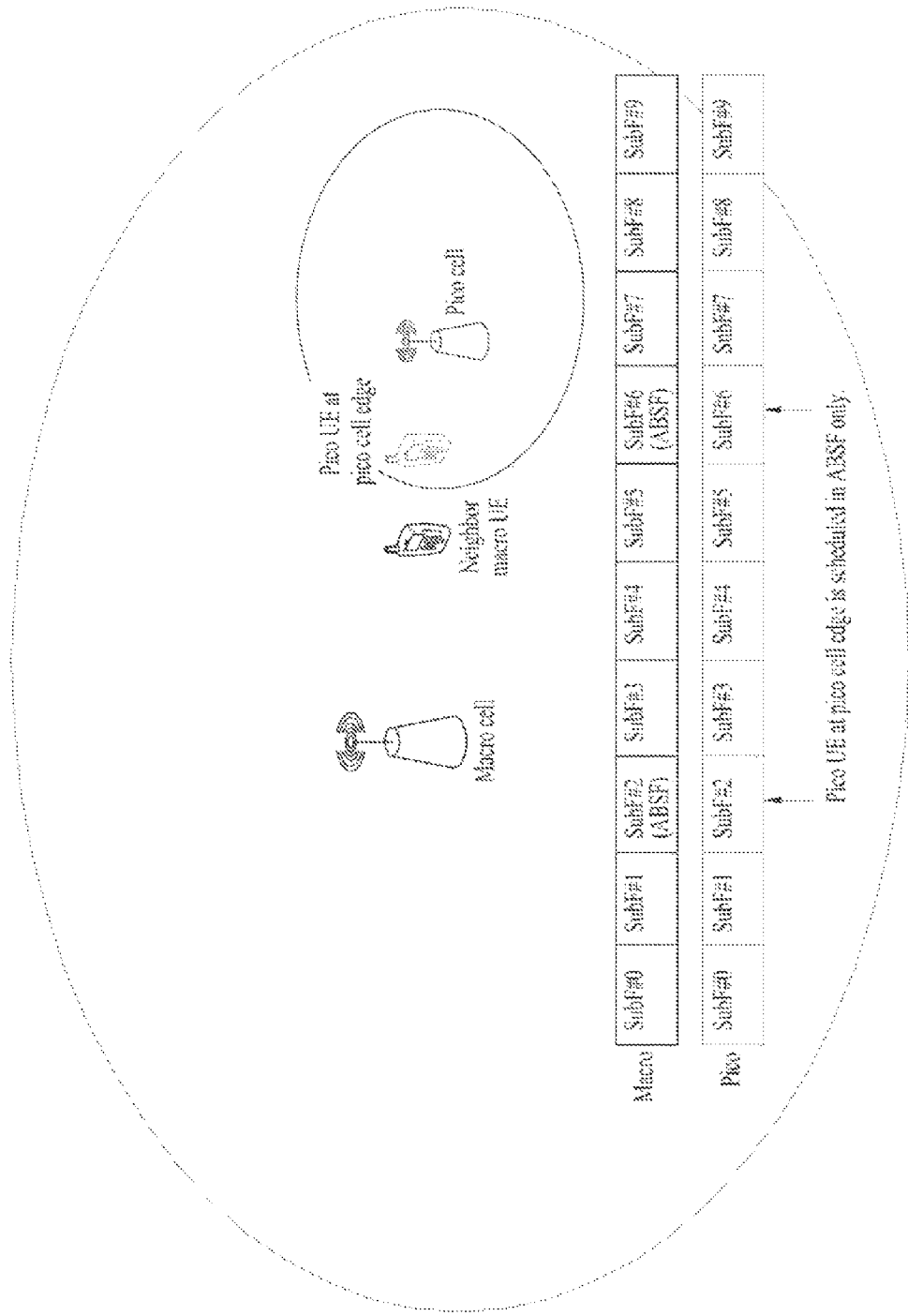
FIG. 9 exemplarily illustrates the configuration of an almost blank subframe (ABS) for a macro cell in a macro-pico network.

FIG. 9 exemplarily illustrates the configuration of an ABS for a macro cell in a macro-pico network.

Referring to FIG. 9, the macro cell may configure subframes indexed #2 and #6 as ABSFs, and this information may be indicated to a pico cell through backhauling. The pico cell may schedule a pico UE (i.e., a UE served by the pico cell), specifically, UEs located at a boundary between the macro cell and pico cell, only in the ABSFs based on the information received from the macro cell. That is, the pico UE performs CSI measurement only in the ABSFs.

In order to prevent an unnecessary radio link failure (RLF) and to accurately measure RSRP, reference signal received quality (RSRQ), etc., the interfered UE is configured to perform measurement for radio link monitoring (RLM)/radio resource management (RRM) at subframe(s) restricted by the serving cell. To this end, bitmap signaling having the same cycle as backhaul signaling (for example, 1 denotes an ABS and 0 denotes other frames) may be used. However, a pattern thereof should be configured independently from a backhaul bitmap pattern.

Since legacy ICIC technologies are insufficient to overcome co-channel interference, two scenarios such as a CSG scenario and pico scenario are proposed. These scenarios correspond to exemplary network configurations for describing the basic concept of a time domain ICIC, and may be equally applied to other network deployment scenarios.

Figure 10:
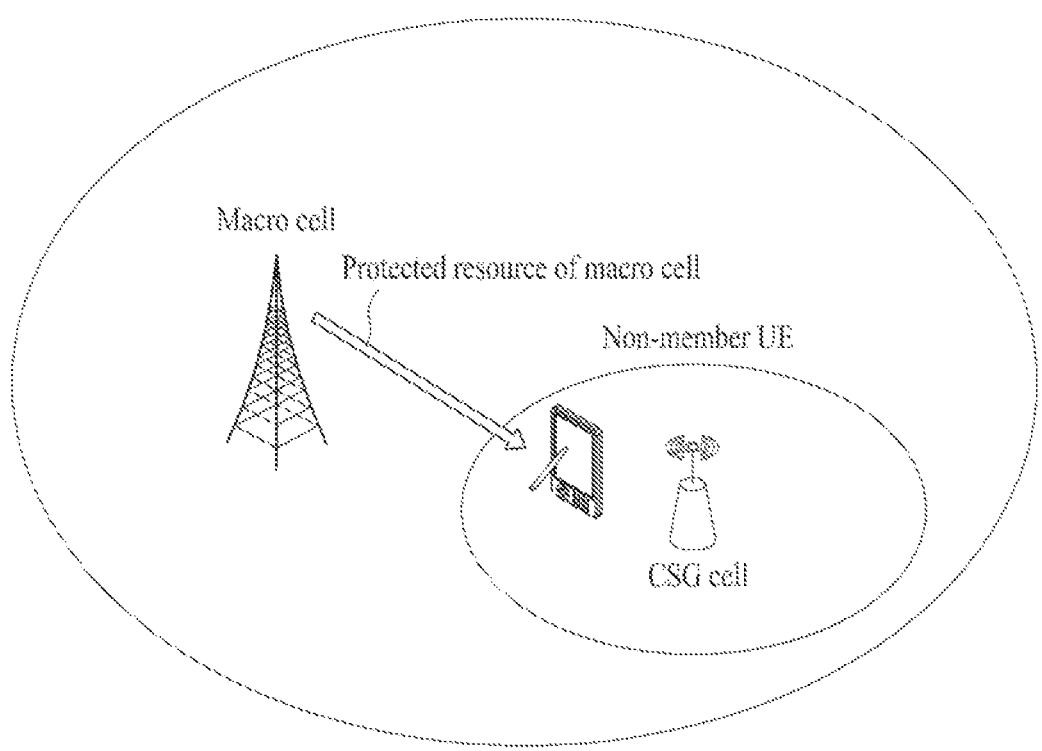
FIG. 10 illustrates a closed subscriber group (CSG) scenario serving as an example of time domain inter-cell interference coordination (ICIC)

FIG. 10 illustrates a CSG scenario serving as an example of time domain ICIC.

Referring to FIG. 10, interference may mostly occur when a UE not allowed to access a CSG cell (hereinafter referred to as a 'non-member UE') approaches the CSG cell. Due to the network deployment and strategy, a UE influenced by inter-cell interference may not be diverted to another Evolved Universal Terrestrial Radio Access (E-UTRA) carrier or another Radio Access Technology (RAT) carrier. Time domain ICIC may be used to allow the non-member UE to be served by a macro cell in the same frequency layer.

Interference may be reduced if the CSG cell uses an ABSF to protect a subframe of the corresponding macro cell from interference. The non-member UE may be signaled to use resources protected for RRM, RLM, and CSI measurement for the serving macro cell, and may be allowed to be continuously served by the macro cell under strong interference from the CSG cell.

In the RRC_CONNECTED state, a network may find that the non-member UE is related to strong interference from the CSG cell using measurement events defined in LTE Release-8/9, and RRM/RLM/CSI measurement resources may be restricted to the UE. In addition, the network may restrict RRM measurement resources for a neighbor cell to facilitate mobility from the serving macro cell. The network may release the restriction of the RRM/RLM/CSI measurement resources if it is detected that the UE no longer receives serious interference from the CSG cell.

Figure 11:
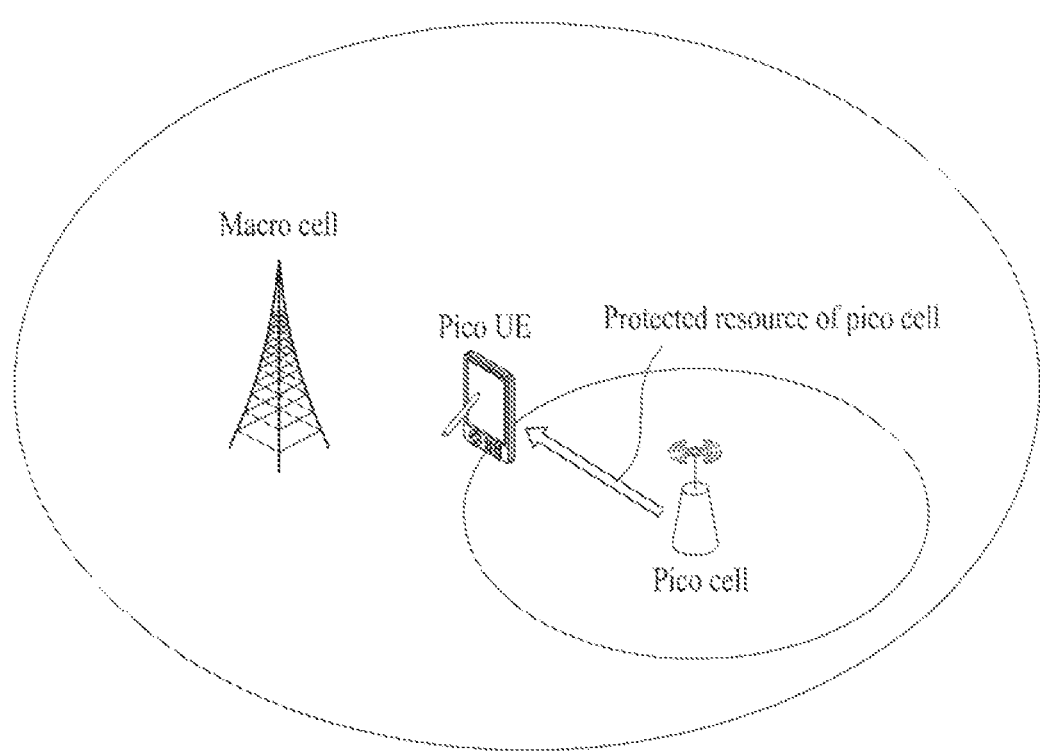
FIG. 11 illustrates a pico scenario serving as another example of time domain ICIC.

FIG. 11 illustrates a pico scenario serving as another example of time domain ICIC.

Referring to FIG. 11, time domain ICIC may be used for a pico UE located at an edge of a serving pico cell (e.g., a UE whose traffic is off-loaded from a macro cell to a pico cell). The time domain ICIC may be used to allow such UE to be served by a pico cell in the same frequency layer. Interference may be reduced if the macro cell uses an ABSF to protect a subframe of the corresponding pico cell from interference. The pico UE (a UE served by the pico cell) may use resources protected for RRM, RLM, and CSI measurement for the serving pico cell. For the pico UE, restriction of the RRM/RLM/CSI measurement resources may allow more accurate measurement of the pico cell under strong interference from the macro cell. The pico cell may selectively set the restriction of the RRM/RLM/CSI measurement resources for only UEs related to strong interference from the macro cell. In addition, for a UE served by the macro cell, a network may restrict RRM measurement resources for a neighbor cell to facilitate mobility from the macro cell to the pico cell.

A detailed description is now given of a scheme for transmitting subframe pattern (e.g., ABS pattern) information between cells.

An interfering cell may signal 2 bitmaps to an interfered cell via an X2 interface. Each bitmap may have a size of 40 bits, and may represent attributes of 40 subframes on a subframe basis. A first bitmap indicates subframes including ABSs. That is, the first bitmap may indicate ABSs as '1' and other subframes as '0'. The second bitmap may indicate subframes to be set with a high probability as ABSs in the first bitmaps. That is, the subframes set as ABSs in the second bitmap may correspond to a subset of the subframes set as ABSs in the first bitmap. The subset may be used by a receiver end to restrict RLM/RRM measurement resources. A serving cell indicates actual resources for RLM/RRM and CSI through RRC signaling.

A bitmap pattern is used to indicate the ABS pattern from a macro cell to a pico cell. The bitmap pattern may have a cycle of 40 ms in an FDD system, a cycle of 20 ms for UL-DL configurations 1 to 5, a cycle of 70 ms for UL-DL configuration 0, and a cycle of 60 ms for UL-DL configuration 6 in a TDD system.

The bitmap pattern may be updated semi-statically. In this case, update trigger may be generated aperiodically based on an event.

2. Time Domain PDCCH Bundling Scheduling

As MU-MIMO, Cooperative Multiple Point Transmission (CoMP), or cross cell scheduling is applied to a wireless access system to support high data rate, the capacity of a legacy PDCCH may be insufficient to transmit a plurality of control information. In addition, if a CCE aggregation level is increased for UEs located at a cell edge, the number of CCEs for transmitting one PDCCH is increased, which may cause restrictions when a PDCCH is transmitted by allocating CCEs to a plurality of UEs and thus blocking probability may be increased. The blocking probability refers to the probability that scheduling information cannot be transmitted because there is no available CCE.

The lack of PDCCH capacity or the increase in blocking probability may cause scheduling restrictions when UEs transmit DL resource assignment information/UL resource assignment information (DL assignment/UL grant), and consequently cause a reduction in cell throughput. The present invention proposes a time domain PDCCH bundling scheduling scheme for increasing the capacity of a legacy PDCCH, and a procedure related to the scheme.

FIG. 12 exemplarily illustrates a DL resource assignment procedure using a legacy PDCCH in an FDD system.

Referring to FIG. 12, an eNB may transmit DL resource assignment information (DL assignment) using a PDCCH, and a UE may receive a PDSCH using the PDCCH transmitted from the eNB. That is, if the PDCCH scrambled with an RNTI for the UE is acquired in an $n^{th}$ subframe through blind decoding, the UE may receive data or information using the PDSCH of the $n^{th}$ subframe. Alternatively, if the PDCCH scrambled with an RNTI for the UE is acquired in an $(n+1)^{th}$ subframe, the UE may receive data or information using the PDSCH of the $(n+1)^{th}$ subframe. In this case, the RNTI for the UE may include a C-RNTI, SI-RNTI, P-RNTI, RA-RNTI, semi-persistent scheduling C-RNTI (SPS C-RNTI), and temporary C-RNTI.

In a TDD system, the PDCCH and PDSCH are transmitted using the procedure of the FDD system but locations for transmitting the PDCCH/PDSCH in one radio frame vary depending on UL-DL configuration. That is, subframes marked "D" in Table 6 above indicate the locations of subframes for transmitting the PDCCH/PDSCH in the radio frame. Here, for a special subframe, the procedure of the DL subframe may be equally performed according to the configuration of the special subframe.

However, the above scheme for scheduling UEs by allocating a PDSCH using one PDCCH may have restrictions (e.g., the lack of PDCCH capacity or the increase in blocking probability) due to the above described problem. Accordingly, a description is now given of a time domain PDCCH bundling scheduling procedure for scheduling a plurality of PDSCHs using one PDCCH.

FIG. 13 exemplarily illustrates time domain PDCCH bundling scheduling according to an embodiment of the present invention.

Referring to FIG. 13, it is shown that a UE receives a bundled PDCCH from an eNB, and receives PDSCHs scheduled using the received PDCCH. FIG. 13(a) shows a bundling size of 3, and FIG. 13(b) shows a bundling size of 4.

As shown in FIG. 13(a), when the bundling size is 3, if a bundled PDCCH is received in an $n^{th}$ subframe, the UE may receive PDSCHs in $n^{th}$, $(n+1)^{th}$, and $(n+2)^{th}$ subframes using the corresponding PDCCH. Furthermore, if a bundled PDCCH is received in an $(n+4)^{th}$ subframe, the UE may receive PDSCHs in $(n+4)^{th}$, $(n+5)^{th}$, and $(n+6)^{th}$ subframes using the corresponding PDCCH As shown in FIG. 13(b), when the bundling size is 4, if a bundled PDCCH is received in an $n^{th}$ subframe, the UE may receive PDSCHs in $n^{th}$, $(n+1)^{th}$, $(n+2)^{th}$, and $(n+3)^{th}$ subframes using the corresponding PDCCH. Furthermore, if a bundled PDCCH is received in an $(n+4)^{th}$ subframe, the UE may receive PDSCHs in $(n+4)^{th}$, $(n+5)^{th}$, $(n+6)^{th}$, and $(n+7)^{th}$ subframes using the corresponding PDCCH As described above, a bundled PDCCH may simultaneously scheduling PDSCHs to be transmitted in subframes corresponding to a bundling size. Here, the subframes for transmitting the scheduled PDSCHs may include the subframe for transmitting the bundled PDCCH (e.g., n or $(n+4)^{th}$ subframe) as shown in FIG. 13, or may not. For convenience of explanation, the following description is given on the assumption that the subframe for transmitting the bundled PDCCH is included in the bundling size.

Although DL resource assignment information (DCI format) for scheduling PDSCHs is described below for convenience of explanation, the following scheme may be equally applied to UL resource assignment information (DCI format) for scheduling PUSCHs. That is, when a UE should transmit PUSCHs using allocated UL resources for a certain time (bundling size), as in the above bundled DCI format for scheduling PDSCHs, an eNB may perform time domain bundling on DCI formats for transmitting UL resource assignment information and may transmit the same using one PDCCH. Accordingly, for UL time bundling, PDSCHs may be replaced with PUSCHs and DCI formats representing DL resource assignment may be replaced with DCI formats representing UL resource assignment in the following description. In addition, this scheme may be equally applied to bundling of DL resource assignment information for scheduling PDSCHs and UL resource assignment information for scheduling PUSCHs.

2.1. Time Domain PDCCH Bundling Scheduling Configuration 2.1.1. Higher Layer Signaling Configuration An eNB may set configurations about time domain PDCCH bundling scheduling and a bundling size and transmit the configurations to a UE through higher layer signaling (e.g., RRC signaling). After the configuration of time domain PDCCH bundling scheduling is set by the eNB, if a PDCCH is received from the eNB, the UE may perceive that the received PDCCH assigns PDSCHs corresponding to the bundling size, and acquire data or information using the corresponding PDSCHs. Here, the eNB may transmit the configuration indicating whether time domain PDCCH bundling scheduling is applied, and the configuration of the bundling size according to time domain PDCCH bundling scheduling, to the UE separately or integrally.

Initially, the configuration indicating whether time domain PDCCH bundling scheduling is applied, and the configuration of the bundling size according to time domain PDCCH bundling scheduling may be transmitted separately. In this case, the eNB may transmit information about the bundling size to the UE as shown in Tables 11 and 12.

Tables 11 and 12 exemplarily show higher layer parameters for time domain bundling size configurations.

TABLE 11

| Bit of time domain bundling size | Information |
| --- | --- |
| 00 | 2 subframes bundling |
| 01 | 3 subframes bundling |
| 10 | 4 subframes bundling |
| 11 | 5 subframes bundling |

TABLE 12

| Bit of time domain bundling size | Information |
| --- | --- |
| 00 | 1 subframes bundling |
| 01 | 2 subframes bundling |
| 10 | 3 subframes bundling |
| 11 | 4 subframes bundling |

Referring to Tables 11 and 12, it is shown that, if time domain PDCCH bundling scheduling is applied, a time domain bundling size field transmitted to the UE is represented using 2 bits. Here, 1 subframe bundling means that, if the UE receives a PDCCH in an $n^{th}$ subframe, the corresponding PDCCH schedules a PDSCH of the $n^{th}$ subframe. 2 subframe bundling means that, if the UE receives a PDCCH in an $n^{th}$ subframe, the corresponding PDCCH schedules a PDSCH of the $n^{th}$ subframe and a PDSCH of an $(n+1)^{th}$ subframe. This principal is equally applied to 3 subframe bundling and 4 subframe bundling.

However, Tables 11 and 12 are merely exemplary. Information indicated by each bit of the time domain bundling size field may be changed and the time domain bundling size field may have a bit size other than 2 bits, for example, 3, 4, or 5 bits.

Alternatively, the configuration indicating whether time domain PDCCH bundling scheduling is applied, and the configuration of the bundling size according to time domain PDCCH bundling scheduling may be transmitted integrally. In this case, the eNB may combine information about whether time domain PDCCH bundling scheduling is applied, and information about the bundling size, and transmit the information to the UE using one field.

Tables 13 and 14 exemplarily show higher layer parameters for time domain PDCCH bundling scheduling configurations and bundling size configurations.

TABLE 13

| Bit of time domain bundling configuration field | Information |
| --- | --- |
| 00 | Not bundling |
| 01 | 2 subframes bundling |
| 10 | 3 subframes bundling |
| 11 | 4 subframes bundling |

TABLE 14

| Bit of time domain bundling configuration field | Information |
| --- | --- |
| 00 | Not bundling |
| 01 | 1 subframes bundling |

TABLE 14-continued

| Bit of time domain bundling configuration field | Information |
|---|---|
| 10 | 2 subframes bundling |
| 11 | 3 subframes bundling |

Referring to Tables 13 and 14, a time domain PDCCH bundling scheduling configuration and bundling size field is represented using 2 bits. Here, "No bundling" means that time domain PDCCH bundling scheduling is not applied and, if the UE receives a PDCCH in an $n^{th}$ subframe, the corresponding PDCCH schedules a PDSCH of the $n^{th}$ subframe. 1 subframe bundling, 2 subframe bundling, and 3 subframe bundling means that time domain PDCCH bundling scheduling is applied and a bundled PDCCH schedules PDSCHs of subframes corresponding to each bundling size.

However, Tables 13 and 14 are merely exemplary. Information indicated by each bit of the time domain PDCCH bundling scheduling configuration and bundling size field may be changed, and the time domain PDCCH bundling scheduling configuration and bundling size field may have a bit size other than 2 bits, for example, 3, 4, or 5 bits.

2.1.2. PDCCH Configuration

An eNB may use a specific field in a PDCCH to perform dynamic time bundling scheduling. In this case, reserved bits in the PDCCH may be used for time bundling scheduling or a field for time bundling scheduling may be newly defined and used.

A field for time bundling scheduling, which is transmitted via the PDCCH, may include both a configuration indicating whether time domain PDCCH bundling scheduling is applied, and a configuration of a bundling size according to time domain PDCCH bundling scheduling. In addition, after the configuration indicating whether time domain PDCCH bundling scheduling is applied is set through higher layer signaling, the field for time bundling scheduling, which is transmitted via the PDCCH, may include only the configuration of the bundling size.

Figure 14:
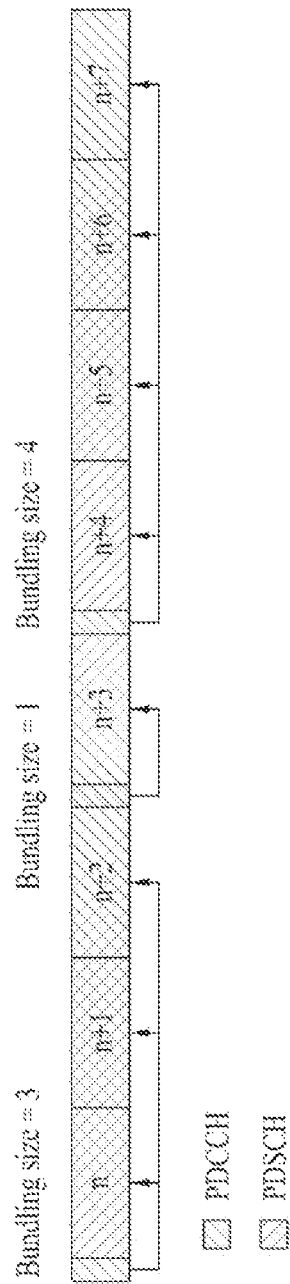
FIG. 14 exemplarily illustrates time domain PDCCH bundling scheduling according to another embodiment of the present invention.

FIG. 14 exemplarily illustrates time domain PDCCH bundling scheduling according to another embodiment of the present invention.

Referring to FIG. 14, it is shown that each of PDCCHs transmitted in $n^{th}$, $(n+3)^{th}$, and $(n+4)^{th}$ subframes indicates a bundling size. That is, a PDCCH received in the $n^{th}$ subframe indicates a bundling size of 3 such that the corresponding PDCCH schedules PDSCHs of $n^{th}$, $(n+1)^{th}$, and $(n+2)^{th}$ subframes, a PDCCH received in the $(n+3)^{th}$ subframe indicates a bundling size of 1 such that the corresponding PDCCH schedules a PDSCH of the $(n+3)^{th}$ subframe, and a PDCCH received in the $(n+4)^{th}$ subframe indicates a bundling size of 4 such that the corresponding PDCCH schedules PDSCHs of $(n+4)^{th}$, $(n+5)^{th}$, $(n+6)^{th}$, and $(n+7)^{th}$ subframes.

After a configuration indicating whether time domain PDCCH bundling scheduling is applied is transmitted through higher layer signaling, if a configuration of a bundling size is transmitted using a bit field in a PDCCH, field information in the PDCCH may be configured as shown in Tables 15 and 16.

Tables 15 and 16 exemplarily show PDCCH parameters for time domain bundling size configurations.

TABLE 15

| Bit of time domain bundling size | Information |
|---|---|
| 00 | 2 subframes bundling |
| 01 | 3 subframes bundling |
| 10 | 4 subframes bundling |
| 11 | 5 subframes bundling |

TABLE 16

| Bit of time domain bundling size | Information |
|---|---|
| 00 | 1 subframes bundling |
| 01 | 2 subframes bundling |
| 10 | 3 subframes bundling |
| 11 | 4 subframes bundling |

Referring to Tables 15 and 16, it is shown that a time domain bundling size field is represented using 2 bits. Here, information about a bundling size indicates that a corresponding PDCCH schedules PDSCHs of a number of subframes corresponding to the bundling size.

However, Tables 15 and 16 are merely exemplary. Information indicated by each bit of the time domain bundling size field may be changed, and the time domain bundling size field may have a bit size other than 2 bits, for example, 3, 4, or 5 bits.

2.2. Bundled PDCCH Payload

If time domain PDCCH bundling scheduling is configured, a DCI format in an $n^{th}$ subframe for transmitting a PDCCH may be configured as described below.

2.2.1. Multiplexing

An eNB may multiplex DCI formats of subframes corresponding to a bundling size configured for a corresponding UE and transmit the multiplexed DCI format in an $n^{th}$ subframe for transmitting a PDCCH. In this case, the DCI formats to be bundled may be sequentially arranged in order of time. That is, if it is assumed that the bundling size is 4 and a payload size of a DCI format for scheduling one PDSCH is equally m, a bundled DCI format transmitted in an $n^{th}$ subframe may include (4×m) bits and sequentially include resource assignment information of PDSCHs of $n^{th}$, $(n+1)^{th}$, $(n+2)^{th}$, and $(n+3)^{th}$ subframes. Consequently, since DCI formats for scheduling PDSCHs of subframes are multiplexed and then CRC parity bits are inserted into a bundled DCI format including (4×m) bits, (4−1)×16 bits (CRC parity bits) may be saved as a result. Although the same DCI format payload size for scheduling each PDSCH is assumed for convenience of explanation, PDSCHs to be scheduled may have different DCI format payload sizes. Even in this case, a payload size of a bundled DCI format may be a sum of payload sizes of DCI formats to be bundled, and the DCI formats to be bundled may be sequentially arranged in order of time.

If the DCI formats to be bundled are multiplexed as described above, the payload size of the bundled DCI format is different from a conventional payload size of a DCI format. Accordingly, the bundled DCI format may be transmitted only in a USS so as not to increase the number of times that blind decoding is performed by a UE. That is, if time domain PDCCH bundling scheduling is configured, since a UE expects a bundled DCI format in a USS, a bundled DCI format of subframes may be detected without increasing the number of times that blind decoding is performed. For example, the UE may perform blind decoding in a USS using a bit size of DCI format 0/1A, and perform blind decoding using a bundled DCI format payload size predicted (calculated) using a configured bundling size.

2.2.2. Restriction or Elimination/Omission

A time static channel has a relatively uniform frequency channel response in the time domain. Accordingly, if time domain PDCCH bundling scheduling is configured, an eNB may restrict or eliminate some fields of a DCI format for a PDSCH of each subframe, which is to be bundled, and then transmit the DCI format in an $n^{th}$ subframe for transmitting a PDCCH. In this case, fields to be restricted or eliminated may include at least one of a resource assignment field, MCS field, HARQ process number field, redundancy version field, downlink assignment index (DAI) field, TPC command field, and precoding information field. In addition, one or more of the above-mentioned fields may be grouped into a subset, and the subset may be restricted or eliminated. That is, DCI formats of $(n+1)^{th}$, $(n+2)^{th}$, ..., $(n+bundling\ size-1)^{th}$ subframes based on a DCI format of an $n^{th}$ subframe (a DCI format of a most preceding subframe) may be multiplexed after some or a subset of the above-mentioned fields are restricted or eliminated. Alternatively, DCI formats of $(n+1)^{th}$, $(n+2)^{th}$, ..., $(n+bundling\ size-1)^{th}$ subframes other than a DCI format of an $n^{th}$ subframe (a DCI format of a most preceding subframe) may be configured as a bundled DCI format by omitting all fields.

In this case, information about fields included in the DCI format of the $n^{th}$ subframe (the DCI format of a most preceding subframe) may also be used as information about omitted fields of the DCI formats of the $(n+1)^{th}$, $(n+2)^{th}$, ..., $(n+bundling\ size-1)^{th}$ subframes. That is, the omitted fields may be replaced with the fields included in the DCI format of the $n^{th}$ subframe. For example, a UE may apply at least one of a resource assignment field, MCS field, redundancy version field, TPC command field, and precoding information field equally to all PDSCHs corresponding to a bundling size.

According to the above-described scheme, a payload size of a bundled DCI format to be transmitted on an $n^{th}$ subframe may be greatly reduced and maintained to be the same as a payload size of a specific DCI format. For example, the payload size of the bundled DCI format may be maintained to be the same as a payload size of DCI format 0/1A.

The bundled DCI format maintained to be the same as the payload size of DCI format 0/1A may be transmitted in a CSS or USS. That is, if time domain PDCCH bundling scheduling is configured, the UE may perceive that a DCI format detected by performing blind decoding in a CSS or USS is a bundled DCI format. In this case, a bundling size may be determined based on the size of DCI format 0/1A. That is, the bundling size may be determined in such a manner that "bundled DCI format payload size (DCI format of $n^{th}$ subframe+((bundling size−1)×restricted DCI format))<=DCI format 0/1A payload size".

In addition, the bundled DCI format maintained to be the same as the payload size of DCI format 0/1A may be restricted from being transmitted in a CSS for fall back. That is, a DCI format to be transmitted in a CSS may be restricted to DCI format 0/1A, and only a DCI format having the payload size of DCI format 0/1A to be transmitted in a USS may be restricted to a bundled DCI.

2.3. HARQ Process Number Field

A maximum number of HARQ processes is given as 8 in an FDD system, and given according to UL-DL configurations in a TDD system as shown in Table 17.

Table 17 shows a maximum number of HARQ processes in a TDD system.

TABLE 17

| TDD UL/DL configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |

If time domain PDCCH bundling scheduling is configured, a HARQ process number field among fields indicating a bundled DCI format of PDSCHs within a bundling size may be separately configured differently from the above-described fields indicating the bundled DCI format. A HARQ process number field of each PDSCH may be transmitted to a UE as described below.

2.3.1. Multiplexing

HARQ process number fields of PDSCHs within a bundling size may be multiplexed and transmitted. Accordingly, the HARQ process number field transmitted as the bundled DCI format may be changed according to the bundling size. For example, the HARQ process number field may include (bundling size×3) bits in an FDD system, and (bundling size× 4) bits in a TDD system. In this case, if the bundling size is fixed, the number of bits of the HARQ process number field of the bundled DCI format may also be fixed.

2.3.2. Restriction or Elimination

An eNB may transmit a HARQ process number field corresponding to the first transmitted PDSCH, using a bundled DCI format, and equally apply the HARQ process number field to all PDSCHs within a bundling size. Accordingly, the HARQ process number field transmitted using the bundled DCI format indicates a HARQ process number of PDSCHs within the same bundling size, and a bit size thereof may be 3 bits in an FDD system, and 4 bits in a TDD system.

Alternatively, the eNB may transmit a HARQ process number field of the first transmitted PDSCH, using a bundled DCI format, and indicate HARQ process numbers of the first transmitted PDSCH and other PDSCHs (from the second transmitted PDSCH to the last transmitted PDSCH) using the transmitted HARQ process number field. That is, if the HARQ process number of the first PDSCH is n, the HARQ process number of subsequent PDSCHs may be expressed as n+k, and the value k may be increased to integer multiples as a subframe number is increased. For example, the HARQ process number of the second PDSCH may be determined as n+k, and the HARQ process number of the third PDSCH may be determined as n+2k. In this case, if the HARQ process number of each PDSCH is greater than a maximum HARQ process number (e.g., 8 in an FDD system and 15 in a TDD system), the HARQ process number may be determined using modulo operation. That is, the HARQ process number may be determined as "(specific subframe HARQ process number) mod (maximum HARQ process number)". Here, the value k may be indicated to a UE through higher layer signaling or using a predefined constant.

2.3.3. Synchronous HARQ

Unlike uplink, in downlink, a HARQ process operates non-synchronously. That is, a DL retransmission timing operates irrespective of an initial transmission timing of downlink data or an ACK/NACK transmission timing of a UE. However, if the retransmission timing operates synchronously with the initial transmission timing or the ACK/NACK transmission timing of the UE, a HARQ process number field of a bundled DCI format may not be transmitted. That is, DL retransmission may be performed similarly to UL retransmission. For example, if time domain PDCCH bundling scheduling is configured in an FDD system and initial PDSCH transmission is performed in an $(n-4)^{th}$ subframe, ACK/NACK is transmitted in an $n^{th}$ subframe. In this case, if the UE transmits NACK via a PUCCH/PUSCH, an eNB may perform retransmission in an $(n+4)^{th}$ subframe.

In a TDD system, as shown in Table 18, if the eNB transmits a PDSCH in an $(n-k)^{th}$ subframe, the UE transmits ACK/NACK in an $n^{th}$ subframe.

Table 18 shows HARQ ACK/NACK transmission timings k according to UL-DL configurations in a TDD system.

TABLE 18

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In this case, if the UE transmits NACK via a PUCCH/PUSCH, the eNB may perform retransmission in an $(n+j)^{th}$ subframe as shown in Table 19. Accordingly, the eNB may configure a bundled DCI format without using a HARQ process number field, and the UE may receive a PDSCH retransmitted using a synchronous HARQ process.

Table 19 shows retransmission timings j according to UL-DL configurations in a TDD system.

TABLE 19

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

2.3.4. Downlink Assignment Index

A downlink assignment index (DAI) is a parameter used in a TDD system and indicates the number of PDCCHs accompanied with PDSCHs accumulated in a bundling window for ACK/NACK transmission, or the number of PDCCHs for SPS release. That is, an eNB uses the DAI to indicate the number of downlink transmissions to which a UE transmits one ACK/NACK response. Accordingly, if time domain PDCCH bundling scheduling is configured, the UE may perform a HARQ process by regarding that a DAI of a bundled DCI format is increased by one for every PDSCH which is within a bundling size and transmitted in a subframe after the bundled DCI format is transmitted, or regarding that the DAI is equally applied to all PDSCHs within the bundling size.

2.4. ACK/NACK Procedure to Bundled PDSCH

Regarding a HARQ process of a UE via a bundled PDSCH according to time domain PDCCH bundling scheduling, the UE may transmit ACK/NACK/DTX information to the bundled PDSCH received from an eNB, via a PUCCH. In this case, the UE may use PUCCH format 1a, PUCCH format 1b with channel selection, or PUCCH format 3. A transmission timing of the PUCCH may be determined as described below.

2.4.1. Transmission Based on Last PDSCH

A transmission timing of a PUCCH may be determined based on the last PDSCH among PDSCHs indicated by a bundled DCI format. At this time, in an FDD system, the PUCCH is transmitted in an $n^{th}$ subframe based on an $(n-4)^{th}$ PDSCH. In a TDD system, the PUCCH is transmitted in an $n^{th}$ subframe in response to an $(n-k)^{th}$ PDSCH according to a UL-DL configuration as shown in Table 18.

Figure 15:
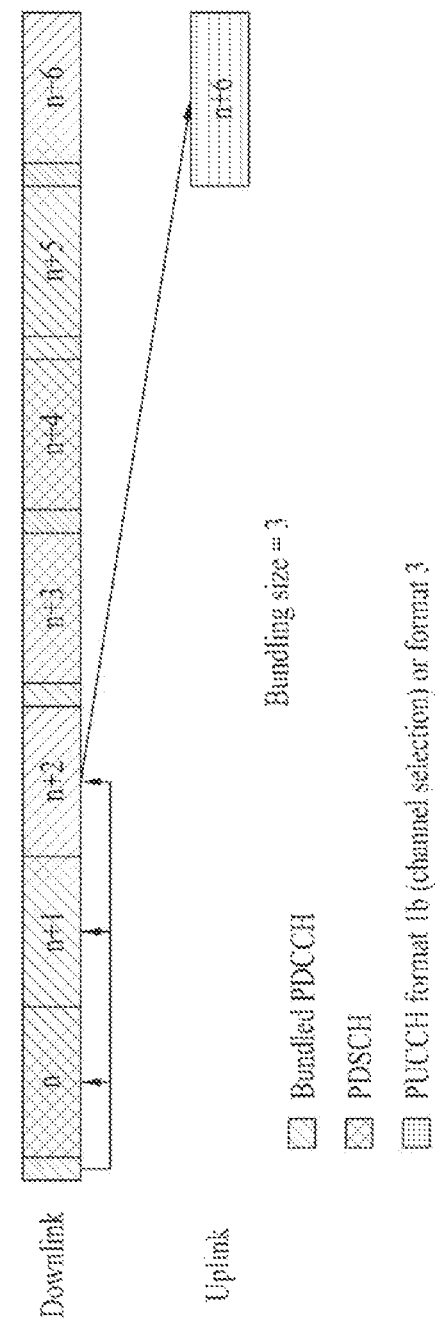
FIG. 15 exemplarily illustrates physical uplink control channel (PUCCH) transmission in response to a bundled physical downlink shared channel (PDSCH), according to an embodiment of the present invention.

FIG. 15 exemplarily illustrates PUCCH transmission in response to a bundled PDSCH, according to an embodiment of the present invention.

Referring to FIG. 15, if a bundling size is 3 in an FDD system, a transmission timing of a PUCCH may be calculated based on an $(n+2)^{th}$ subframe which is the last subframe within the bundling size, and the PUCCH is transmitted in an $(n+6)^{th}$ subframe.

Here, ACK/NACK information transmitted via the PUCCH may be configured as described below.

2.4.1.1. Bundling

A UE may bundle ACK/NACK information to PDSCHs corresponding to a bundling size according to time domain PDCCH bundling scheduling and transmit the ACK/NACK information at a transmission timing of a PUCCH. An eNB may determine whether to perform retransmission based on the PUCCH transmitted from the UE, and retransmit the PDSCHs corresponding to the bundling size upon determining to perform retransmission. That is, if NACK information to at least one of the PDSCHs within the bundling size is received, the eNB retransmits all PDSCHs corresponding to the bundling size.

Here, if the eNB transmits 1 TB via a PDSCH, the UE may transmit 1-bit ACK/NACK information using PUCCH format 1a. Alternatively, if the eNB transmits 2 TBs via PDSCHs, the UE may transmit 2-bit ACK/NACK information using PUCCH format 1b. However, if one or more SCells are configured, the UE may use PUCCH format 1b with channel selection, or PUCCH format 3. Here, channel selection refers to a scheme for transmitting ACK/NACK bits by distributing PUCCH resources when information to be transmitted includes 3 or more bits because PUCCH format 1b has a bit size of 2. Accordingly, information transmitted by the UE may be identified according to the location of PUCCH resources for transmitting the PUCCH as well as bit values of ACK/NACK information. When PUCCH format 1b and PUCCH format 3 are used as described above, transmission procedures of PUCCH format 1b with channel selection, and PUCCH format 3 in an LTE/LTE-A system may be equally performed.

The index of PUCCH format resources may be determined according to an antenna port used for PUCCH transmission as shown in Equation 4.

$$n_{PUCCH}^{(1,\tilde{p}=p0)} = n_{CCE} + N_{PUCCH}^{(1)} \text{ (if antenna port 1 is used)}$$

$$n_{PUCCH}^{(1,\tilde{p}=p1)} = n_{CCE} + 1 + N_{PUCCH}^{(1)} \text{ (if antenna port 2 is used)} \quad \text{[Equation 4]}$$

In Equation 4, $N_{PUCCH}^{(1)}$ is determined through higher layer signaling, and $n_{CCE}$ refers to the lowest CCE index for transmitting a bundled DCI format via a PDCCH. In addition, if one or more SCells are configured, PUCCH resources may be determined in the same manner as an LTE/LTE-A system or indicated through higher layer signaling.

2.4.1.2. Multiplexing

In the above-described bundling scheme, when an eNB performs retransmission according to information of a PUCCH transmitted by a UE, PUSCHs corresponding to a bundling size used for initial transmission should be transmitted. Accordingly, if ACK/NACK to PDSCHs corresponding to the bundling size are multiplexed and transmitted, the eNB may efficiently operate by retransmitting only a PDSCH corresponding to NACK information. For example, if a bundling size is 4 and 1 TB is transmitted, since ACK/NACK bits which should be transmitted by the UE are 4 bits, the UE may transmit ACK/NACK information to the eNB using PUCCH format 1b with channel selection, or PUCCH format 3. As described above, channel selection refers to a scheme for transmitting ACK/NACK bits by distributing PUCCH resources when information to be transmitted includes 3 or more bits because PUCCH format 1b has a bit size of 2. That is, since information to be transmitted is determined differently according to the location of PUCCH resources, the UE may transmit 3-or-more-bit information to the eNB using only 2 bits.

If PUCCH format 1b with channel selection is used, a resource mapping table may be configured according to a bundling size and TB size as shown in Tables 20 to 28.

Table 20 shows an example of a resource mapping table when a total ACK/NACK bit size is 2.

TABLE 20

| HARQ-ACK(0) | HARQ-ACK(1) | $n_{PUCCH,i}^{(1)}$ | b(0)b(1) |
|---|---|---|---|
| ACK | ACK | $n_{PUCCH,1}^{(1)}$ | 1,1 |
| ACK | NACK/DTX | $n_{PUCCH,0}^{(1)}$ | 1,1 |
| NACK/DTX | ACK | $n_{PUCCH,1}^{(1)}$ | 0,0 |
| NACK | NACK/DTX | $n_{PUCCH,0}^{(1)}$ | 0,0 |
| DTX | NACK/DTX | | No Transmission |

Table 21 shows another example of a resource mapping table when a total ACK/NACK bit size is 2.

TABLE 21

| HARQ-ACK(0), HARQ-ACK(1) | $n_{PUCCH}^{(1)}$ | b(0),b(1) |
|---|---|---|
| ACK, ACK | $n_{PUCCH,1}^{(1)}$ | 1,1 |
| ACK, NACK/DTX | $n_{PUCCH,0}^{(1)}$ | 0,1 |
| NACK/DTX, ACK | $n_{PUCCH,1}^{(1)}$ | 0,0 |
| NACK/DTX, NACK | $n_{PUCCH,1}^{(1)}$ | 1,0 |
| NACK, DTX | $n_{PUCCH,0}^{(1)}$ | 1,0 |
| DTX, DTX | | No Transmission |

Table 22 shows another example of a resource mapping table when a total ACK/NACK bit size is 2.

TABLE 22

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1,0 |
| ACK, NACK/DTX | $n_{PUCCH,0}^{(1)}$ | 1,1 |
| NACK/DTX, ACK | $n_{PUCCH,1}^{(1)}$ | 0,1 |
| NACK, NACK/DTX | $n_{PUCCH,0}^{(1)}$ | 0,0 |
| DTX, NACK/DTX | | No Transmission |

Table 23 shows an example of a resource mapping table when a total ACK/NACK bit size is 3.

TABLE 23

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1,1 |
| ACK | NACK/DTX | ACK | $n_{PUCCH,1}^{(1)}$ | 1,0 |
| NACK/DTX | ACK | ACK | $n_{PUCCH,1}^{(1)}$ | 0,1 |
| NACK/DTX | NACK/DTX | ACK | $n_{PUCCH,2}^{(1)}$ | 1,1 |
| ACK | ACK | NACK/DTX | $n_{PUCCH,0}^{(1)}$ | 1,1 |
| ACK | NACK/DTX | NACK/DTX | $n_{PUCCH,0}^{(1)}$ | 1,0 |
| NACK/DTX | ACK | NACK/DTX | $n_{PUCCH,0}^{(1)}$ | 0,1 |
| NACK/DTX | NACK/DTX | NACK | $n_{PUCCH,2}^{(1)}$ | 0,0 |
| NACK | NACK/DTX | DTX | $n_{PUCCH,0}^{(1)}$ | 0,0 |
| NACK/DTX | NACK | DTX | $n_{PUCCH,0}^{(1)}$ | 0,0 |
| DTX | DTX | DTX | | No Transmission |

Table 24 shows another example of a resource mapping table when a total ACK/NACK bit size is 3.

TABLE 24

| HARQ-ACK(0), HARQ-ACK(1), HARQ-ACK(2) | $n_{PUCCH}^{(1)}$ | b(0),b(1) |
|---|---|---|
| ACK, ACK, ACK | $n_{PUCCH,2}^{(1)}$ | 1,1 |
| ACK, ACK, NACK/DTX | $n_{PUCCH,1}^{(1)}$ | 1,1 |
| ACK, NACK/DTX, ACK | $n_{PUCCH,0}^{(1)}$ | 1,1 |
| ACK, NACK/DTX, NACK/DTX | $n_{PUCCH,0}^{(1)}$ | 0,1 |
| NACK/DTX, ACK, ACK | $n_{PUCCH,2}^{(1)}$ | 1,0 |
| NACK/DTX, ACK, NACK/DTX | $n_{PUCCH,1}^{(1)}$ | 0,0 |
| NACK/DTX, NACK/DTX, ACK | $n_{PUCCH,2}^{(1)}$ | 0,0 |
| DTX, DTX, NACK | $n_{PUCCH,2}^{(1)}$ | 0,1 |
| DTX, NACK, NACK/DTX | $n_{PUCCH,1}^{(1)}$ | 1,0 |
| NACK, NACK/DTX, NACK/DTX | $n_{PUCCH,0}^{(1)}$ | 1,0 |
| DTX, DTX, DTX | | No transmission |

Table 25 shows another example of a resource mapping table when a total ACK/NACK bit size is 3.

TABLE 25

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1,1 |
| ACK, ACK, NACK/DTX | $n_{PUCCH,1}^{(1)}$ | 1,0 |
| ACK, NACK/DTX, ACK | $n_{PUCCH,2}^{(1)}$ | 1,0 |
| ACK, NACK/DTX, NACK/DTX | $n_{PUCCH,0}^{(1)}$ | 1,1 |
| NACK/DTX, ACK, ACK | $n_{PUCCH,2}^{(1)}$ | 0,1 |
| NACK/DTX, ACK, NACK/DTX | $n_{PUCCH,1}^{(1)}$ | 0,1 |
| NACK/DTX, NACK/DTX, ACK | $n_{PUCCH,2}^{(1)}$ | 0,0 |
| NACK, NACK/DTX, NACK/DTX | $n_{PUCCH,0}^{(1)}$ | 0,0 |
| DTX, NACK/DTX, NACK/DTX | | No transmission |

Table 26 shows an example of a resource mapping table when a total ACK/NACK bit size is 4.

TABLE 26

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1,1 |
| ACK | NACK/DTX | ACK | ACK | $n_{PUCCH,2}^{(1)}$ | 0,1 |
| NACK/DTX | ACK | ACK | ACK | $n_{PUCCH,1}^{(1)}$ | 0,1 |
| NACK/DTX | NACK/DTX | ACK | ACK | $n_{PUCCH,3}^{(1)}$ | 1,1 |
| ACK | ACK | ACK | NACK/DTX | $n_{PUCCH,1}^{(1)}$ | 1,0 |
| ACK | NACK/DTX | ACK | NACK/DTX | $n_{PUCCH,2}^{(1)}$ | 0,0 |
| NACK/DTX | ACK | ACK | NACK/DTX | $n_{PUCCH,1}^{(1)}$ | 0,0 |
| NACK/DTX | NACK/DTX | ACK | NACK/DTX | $n_{PUCCH,3}^{(1)}$ | 1,0 |
| ACK | ACK | NACK/DTX | ACK | $n_{PUCCH,2}^{(1)}$ | 1,1 |
| ACK | NACK/DTX | NACK/DTX | ACK | $n_{PUCCH,2}^{(1)}$ | 1,0 |
| NACK/DTX | ACK | NACK/DTX | ACK | $n_{PUCCH,3}^{(1)}$ | 0,1 |
| NACK/DTX | NACK/DTX | NACK/DTX | ACK | $n_{PUCCH,3}^{(1)}$ | 0,0 |
| ACK | ACK | NACK/DTX | NACK/DTX | $n_{PUCCH,0}^{(1)}$ | 1,1 |
| ACK | NACK/DTX | NACK/DTX | NACK/DTX | $n_{PUCCH,0}^{(1)}$ | 1,0 |
| NACK/DTX | ACK | NACK/DTX | NACK/DTX | $n_{PUCCH,0}^{(1)}$ | 0,1 |
| NACK/DTX | NACK | NACK/DTX | NACK/DTX | $n_{PUCCH,0}^{(1)}$ | 0,0 |
| NACK | NACK/DTX | NACK/DTX | NACK/DTX | $n_{PUCCH,0}^{(1)}$ | 0,0 |
| DTX | DTX | NACK/DTX | NACK/DTX | No Transmission | |

Table 27 shows another example of a resource mapping table when a total ACK/NACK bit size is 4.

TABLE 27

| HARQ-ACK(0), HARQ-ACK(1), HARQ-ACK(2), HARQ-ACK(3) | $n_{PUCCH}^{(1)}$ | b(0),b(1) |
|---|---|---|
| ACK, ACK, ACK, ACK | $n_{PUCCH,1}^{(1)}$ | 1,1 |
| ACK, ACK, ACK, NACK/DTX | $n_{PUCCH,1}^{(1)}$ | 1,0 |
| NACK/DTX, NACK/DTX, NACK/DTX | $n_{PUCCH,2}^{(1)}$ | 1,1 |
| ACK, ACK, NACK/DTX, ACK | $n_{PUCCH,1}^{(1)}$ | 1,0 |
| NACK, DTX, DTX, DTX | $n_{PUCCH,0}^{(1)}$ | 1,0 |
| ACK, ACK, NACK/DTX, NACK/DTX | $n_{PUCCH,1}^{(1)}$ | 1,0 |
| ACK, NACK/DTX, ACK, ACK | $n_{PUCCH,3}^{(1)}$ | 0,1 |
| NACK/DTX, NACK/DTX, NACK/DTX, NACK | $n_{PUCCH,3}^{(1)}$ | 1,1 |
| ACK, NACK/DTX, ACK, NACK/DTX | $n_{PUCCH,2}^{(1)}$ | 0,1 |
| ACK, NACK/DTX, NACK/DTX, ACK | $n_{PUCCH,0}^{(1)}$ | 0,1 |
| ACK, NACK/DTX, NACK/DTX, NACK/DTX | $n_{PUCCH,0}^{(1)}$ | 1,1 |
| NACK/DTX, ACK, ACK, ACK | $n_{PUCCH,3}^{(1)}$ | 0,1 |
| NACK/DTX, NACK, DTX, DTX | $n_{PUCCH,1}^{(1)}$ | 0,0 |
| NACK/DTX, ACK, ACK, NACK/DTX | $n_{PUCCH,2}^{(1)}$ | 1,0 |
| NACK/DTX, ACK, NACK/DTX, ACK | $n_{PUCCH,3}^{(1)}$ | 1,0 |
| NACK/DTX, ACK, NACK/DTX, NACK/DTX | $n_{PUCCH,1}^{(1)}$ | 0,1 |
| NACK/DTX, NACK/DTX, ACK, ACK | $n_{PUCCH,3}^{(1)}$ | 0,1 |
| NACK/DTX, NACK/DTX, ACK, NACK/DTX | $n_{PUCCH,2}^{(1)}$ | 0,0 |
| NACK/DTX, NACK/DTX, NACK/DTX, ACK | $n_{PUCCH,3}^{(1)}$ | 0,0 |
| DTX, DTX, DTX, DTX | No transmission | |

Table 28 shows another example of a resource mapping table when a total ACK/NACK bit size is 4.

TABLE 28

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1,1 |
| ACK, ACK, ACK, NACK/DTX | $n_{PUCCH,2}^{(1)}$ | 1,1 |
| ACK, ACK, NACK/DTX, ACK | $n_{PUCCH,0}^{(1)}$ | 1,0 |
| ACK, ACK, NACK/DTX, NACK/DTX | $n_{PUCCH,1}^{(1)}$ | 1,0 |
| ACK, NACK/DTX, ACK, ACK | $n_{PUCCH,3}^{(1)}$ | 1,1 |
| ACK, NACK/DTX, ACK, NACK/DTX | $n_{PUCCH,2}^{(1)}$ | 1,0 |
| ACK, NACK/DTX, NACK/DTX, ACK | $n_{PUCCH,0}^{(1)}$ | 0,1 |
| ACK, NACK/DTX, NACK/DTX, NACK/DTX | $n_{PUCCH,0}^{(1)}$ | 1,1 |
| NACK/DTX, ACK, ACK, ACK | $n_{PUCCH,1}^{(1)}$ | 0,0 |
| NACK/DTX, ACK, ACK, NACK/DTX | $n_{PUCCH,2}^{(1)}$ | 0,1 |
| NACK/DTX, ACK, NACK/DTX, ACK | $n_{PUCCH,3}^{(1)}$ | 1,0 |
| NACK/DTX, ACK, NACK/DTX, NACK/DTX | $n_{PUCCH,1}^{(1)}$ | 0,1 |
| NACK/DTX, NACK/DTX, ACK, ACK | $n_{PUCCH,3}^{(1)}$ | 0,1 |
| NACK/DTX, NACK/DTX, ACK, NACK/DTX | $n_{PUCCH,2}^{(1)}$ | 0,0 |
| NACK/DTX, NACK/DTX, NACK/DTX, ACK | $n_{PUCCH,3}^{(1)}$ | 0,0 |

TABLE 28-continued

| HARQ-ACK(0), HARQ-ACK(1), HARQ-ACK(2), HARQ-ACK(3) | $n_{PUCCH}^{(1)}$ | b(0)b(1) |
|---|---|---|
| NACK, NACK/DTX, NACK/DTX, NACK/DTX DTX, NACK/DTX, NACK/DTX, NACK/DTX | $n_{PUCCH,0}^{(1)}$ No transmission | 0,0 |

Referring to Tables 20 to 28, a UE transmits bits (b(0)b(1)) representing ACK/NACK information to an eNB using indicated PUCCH resources $n_{PUCCH}^{(1)}$ among PUCCH resources configured through higher layer signaling. Here, a total ACK/NACK bit size (sum of ACK/NACK information to be transmitted) may be configured as (bundling size×TB size(number)). That is, HARQ-ACK(0) refers to ACK/NACK to a PDSCH of the first subframe within a bundling size, HARQ-ACK(1) refers to ACK/NACK to a PDSCH of the second subframe within the bundling size, and HARQ-ACK(n) refers to ACK/NACK to a PDSCH of the $n^{th}$ subframe within the bundling size.

When a PUCCH is transmitted using the above-described method, the index of PUCCH format resources may be represented as $n_{PUCCH,i}^{(1)}$, or $n_{PUCCH,i}^{(1)}$ and $n_{PUCCH,i+1}^{(1)}$ if the TB size is 2. As described above, the index of PUCCH format resources may be determined using the lowest CCE index $n_{CCE}$ for transmitting a bundled DCI format via a PDCCH and/or the value $N_{PUCCH}^{(1)}$ configured through higher layer signaling. In addition, for operation shown in Tables 20 to 28, the eNB may use a specific field in a DCI format to indicate one or more of 4 PUCCH resource values configured through higher layer signaling. For example, the eNB may define and use an acknowledgement resource indication/indicator (ARI) field in the DCI format, or use a TPC command field.

In addition, the UE may transmit ACK/NACK information to the eNB using PUCCH format 3. Resources for PUCCH format 3 may be indicated through higher layer signaling. Here, the eNB may use a specific field in a DCI format to indicate a resource value of PUCCH format 3 among 4 or more PUCCH resource values configured through higher layer signaling. For example, the eNB may define and use an ARI field in the DCI format, or use a TPC command field.

2.4.2. Transmission Based on Each PDSCH

A transmission timing of a PUCCH may be determined based on each PDSCH indicated by a bundled DCI format. That is, one PUCCH may be transmitted in response to each PDSCH.

Figure 16:
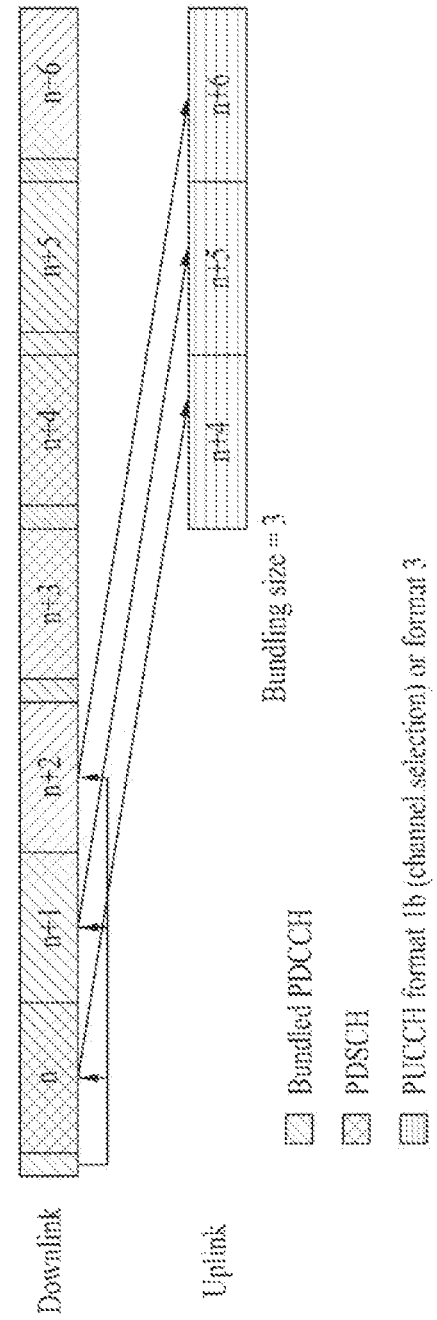
FIG. 16 exemplarily illustrates PUCCH transmission in response to a bundled PDSCH, according to another embodiment of the present invention.

FIG. 16 exemplarily illustrates PUCCH transmission in response to a bundled PDSCH, according to another embodiment of the present invention.

Referring to FIG. 16, if a bundling size is 3 in an FDD system, a UE may transmit PUCCHs in 3 subframes in response to PDSCHs. That is, ACK/NACK information to a PDSCH of an $n^{th}$ subframe may be transmitted using a PUCCH of a $(n+4)^{th}$ subframe, ACK/NACK information to a PDSCH of an $(n+1)^{th}$ subframe may be transmitted using a PUCCH of a $(n+5)^{th}$ subframe, and ACK/NACK information to a PDSCH of an $(n+2)^{th}$ subframe may be transmitted using a PUCCH of a $(n+6)^{th}$ subframe.

However, although the PUCCH of the $(n+4)^{th}$ subframe may be transmitted using a procedure of the legacy LTE/LTE-A system, resources for transmitting the PUCCHs of the subsequent subframes ($(n+5)^{th}$ and $(n+6)^{th}$ subframes) are not defined for the legacy LTE/LTE-A system, and may be determined as described below.

A UE may transmit the PUCCHs by equally maintaining the index of resources for transmitting the first PUCCH with respect to all PUCCHs. That is, resources for transmitting the first PUCCH may be determined through higher layer signaling or using the lowest CCE index for transmitting a bundled DCI format via a PDCCH. For example, the resources may be determined as shown in Equation 4. Accordingly, resources for transmitting the second or subsequent PUCCH may also be determined through higher layer signaling or using the lowest CCE index for transmitting a bundled DCI format via a PDCCH.

Alternatively, resources for transmitting the first PUCCH may be determined through higher layer signaling or using the lowest CCE index for transmitting a bundled DCI format via a PDCCH, and resources for transmitting subsequent PUCCHs may be determined through higher layer signaling.

Otherwise, resources for transmitting the first PUCCH may be determined through higher layer signaling or using the lowest CCE index for transmitting a bundled DCI format via a PDCCH, and resources for transmitting subsequent PUCCHs may be determined by adding a specific value to the resource index. For example, if a resource index of the first transmitted PUCCH is n, the resource index of the second, third, or fourth transmitted PUCCH may be n+k. Here, as a subframe index is increased, the value k for determining a PUCCH resource index may be increased to integer multiples. For example, if the resource index of the first transmitted PUCCH is n, the resource index of the second transmitted PUCCH may be n+k, the resource index of the third transmitted PUCCH may be n+2k, and the resource index of the fourth transmitted PUCCH may be n+3k. In this case, the value k may be indicated through higher layer signaling or a predefined constant may be used.

3. Overview of Apparatus to which Present Invention is Applicable

Figure 17:
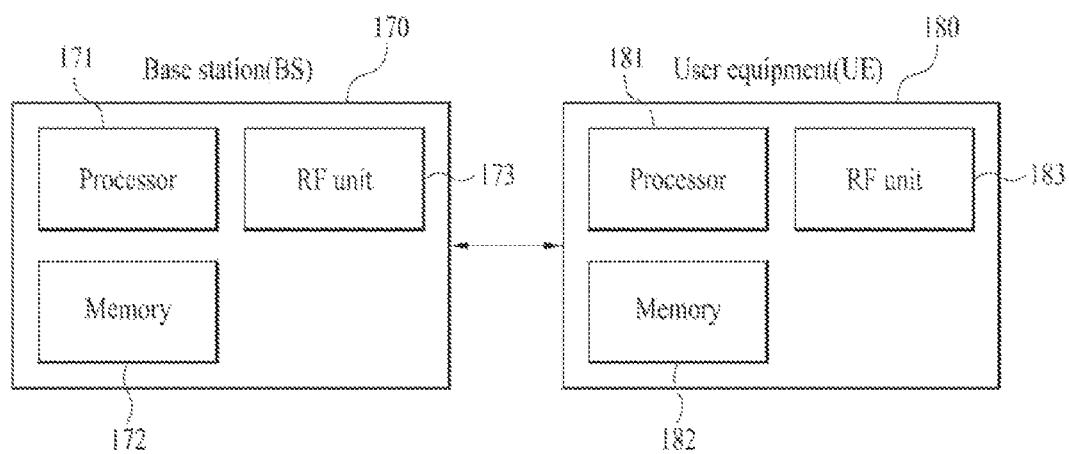
FIG. 17 is a block diagram of a wireless communication apparatus according to an embodiment of the present invention.

FIG. 17 is a block diagram of a wireless communication apparatus according to an embodiment of the present invention.

Referring to FIG. 17, the wireless communication system includes a BS 170 and a plurality of UEs 180 located in the coverage of the BS 170.

The BS 170 includes a processor 171, a memory 172, and a radio frequency (RF) unit 173. The processor 171 implements the above-proposed functions, procedures, and/or schemes. Layers of a wireless interface protocol may be implemented by the processor 171. The memory 172 is connected to the processor 171 and stores various information for driving the processor 171. The RF unit 173 is connected to the processor 171 and transmits and/or receives radio signals.

The UE 180 includes a processor 181, a memory 182, and an RF unit 183. The processor 181 implements the above-proposed functions, procedures, and/or schemes. Layers of a wireless interface protocol may be implemented by the processor 181. The memory 182 is connected to the processor 181 and stores various information for driving the processor 181. The RF unit 183 is connected to the processor 181 and transmits and/or receives radio signals.

The memory 172 or 182 may be located inside or outside the processor 171 or 181, and connected to the processor 171 or 181 via a variety of well-known means. In addition, the BS 170 and/or the UE 180 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

A method of transmitting/receiving data in a wireless access system according to the present invention is applicable to a variety of wireless access systems including the 3GPP LTE system.

The invention claimed is:

1. A method for time domain bundling scheduling in a wireless access system, the method comprising:
transmitting bundled downlink control information (DCI) comprising a plurality of DCI to a user equipment (UE) via one physical downlink control channel (PDCCH); and
transmitting downlink data to the UE via a plurality of physical downlink shared channels (PDSCHs) scheduled by the bundled DCI,
wherein the plurality of DCI are sequentially arranged within the bundled DCI.

2. The method according to claim 1, further comprising transmitting, to the UE, information about whether scheduling by the bundled DCI is configured.

3. The method according to claim 1, wherein at least one field is omitted in remaining DCI other than DCI scheduling a most preceding PDSCH in a time domain from among the plurality of DCI, and information of the omitted field is replaced with information included in a corresponding field of the DCI scheduling the most preceding PDSCH in the time domain.

4. The method according to claim 3, wherein the omitted field comprises at least one of a resource assignment field, a modulation and coding scheme (MCS) field, a redundancy version field, a transmit power control command field, or a precoding information field.

5. The method according to claim 1, wherein the number of the plurality of PDSCHs is determined using a payload size of the bundled DCI.

6. The method according to claim 1, wherein at least one field is omitted in remaining DCI other than DCI scheduling a most preceding PDSCH in a time domain from among the plurality of DCI, and information of the omitted field is indicated by information included in a corresponding field of the DCI scheduling the most preceding PDSCH in the time domain.

7. The method according to claim 6, wherein the omitted field comprises a hybrid automatic repeat and request (HARQ) process number field.

8. The method according to claim 1, wherein a HARQ process number field is omitted in the bundled DCI, and a retransmission timing of the plurality of PDSCHs is determined based on an initial transmission timing of the plurality of PDSCHs or an acknowledgement/negative-acknowledgement (ACK/NACK) transmission timing of the UE.

9. The method according to claim 1, wherein the bundled DCI is transmitted in either a common search space (CSS) or a UE-specific search space (USS).

10. A method for time domain bundling scheduling in a wireless access system, the method comprising:
receiving bundled downlink control information (DCI) comprising a plurality of DCI from a base station (BS) via one physical downlink control channel (PDCCH); and
receiving downlink data from the BS via a plurality of physical downlink shared channels (PDSCHs) scheduled by the bundled DCI,
wherein the plurality of DCI are sequentially arranged within the bundled DCI.

11. The method according to claim 10, further comprising receiving, from the BS, information about whether scheduling by the bundled DCI is configured.

12. The method according to claim 10, wherein at least one field is omitted in remaining DCI other than DCI scheduling a most preceding PDSCH in a time domain from among the plurality of DCI, and information of the omitted field is replaced with information included in a corresponding field of the DCI scheduling the most preceding PDSCH in the time domain.

13. The method according to claim 12, wherein the omitted field comprises at least one of a resource assignment field, a modulation and coding scheme (MCS) field, a redundancy version field, a transmit power control command field, or a precoding information field.

14. The method according to claim 10, wherein the number of the plurality of PDSCHs is determined using a payload size of the bundled DCI.

15. The method according to claim 10, wherein at least one field is omitted in remaining DCI other than DCI scheduling a most preceding PDSCH in a time domain from among the plurality of DCI, and information of the omitted field is indicated by information included in a corresponding field of the DCI scheduling the most preceding PDSCH in the time domain.

16. The method according to claim 15, wherein the omitted field comprises a hybrid automatic repeat and request (HARQ) process number field.

17. The method according to claim 10, wherein a HARQ process number field is omitted in the bundled DCI, and a retransmission timing of the plurality of PDSCHs is determined based on an initial transmission timing of the plurality of PDSCHs or an acknowledgement/negative-acknowledgement (ACK/NACK) transmission timing of the UE.

18. The method according to claim 10, wherein the bundled DCI is transmitted in either a common search space (CSS) or a UE-specific search space (USS).

19. A base station (BS) supporting time domain bundling scheduling in a wireless access system, the BS comprising:
- a radio frequency (RF) unit configured to transmit and receive radio signals; and
- a processor configured to transmit bundled downlink control information (DCI) comprising a plurality of DCI to a user equipment (UE) via one physical downlink control channel (PDCCH), and transmit downlink data to the UE via a plurality of physical downlink shared channels (PDSCHs) scheduled by the bundled DCI, wherein the plurality of DCI are sequentially arranged within the bundled DCI.

20. A user equipment (UE) supporting time domain bundling scheduling in a wireless access system, the UE comprising:
- a radio frequency (RF) unit configured to transmit and receive radio signals; and
- a processor configured to receive bundled downlink control information (DCI) having a plurality of DCI from a base station (BS) via one physical downlink control channel (PDCCH), and receive downlink data from the BS via a plurality of physical downlink shared channels (PDSCHs) scheduled by the bundled DCI, wherein the plurality of DCI are sequentially arranged within the bundled DCI.

* * * * *